(12) United States Patent
Stark

(10) Patent No.: US 9,367,869 B2
(45) Date of Patent: Jun. 14, 2016

(54) SYSTEM AND METHOD FOR VIRTUAL DISPLAY

(71) Applicant: Dean Stark, Toronto (CA)

(72) Inventor: Dean Stark, Toronto (CA)

( * ) Notice: Subject to any disclaimer, the term of this patent is extended or adjusted under 35 U.S.C. 154(b) by 410 days.

(21) Appl. No.: 13/789,042

(22) Filed: Mar. 7, 2013

(65) Prior Publication Data

US 2013/0290139 A1  Oct. 31, 2013

Related U.S. Application Data

(60) Provisional application No. 61/607,898, filed on Mar. 7, 2012.

(51) Int. Cl.
| | |
|---|---|
| *G06Q 30/00* | (2012.01) |
| *G06Q 30/06* | (2012.01) |
| *G06T 13/40* | (2011.01) |
| *G06T 13/80* | (2011.01) |

(52) U.S. Cl.
CPC ........ *G06Q 30/0641* (2013.01); *G06Q 30/0613* (2013.01); *G06T 13/40* (2013.01); *G06T 13/80* (2013.01)

(58) Field of Classification Search
CPC .. G06Q 30/0601–30/0645; G06T 13/00–13/80
USPC .......................... 705/26.1–27.2; 382/115–127
See application file for complete search history.

(56) References Cited

U.S. PATENT DOCUMENTS

| | | | | |
|---|---|---|---|---|
| 3,973,840 | A  * | 8/1976 | Jacobs et al. ..................... | 352/86 |
| 6,183,089 | B1 | 2/2001 | Tehrani ............................. | 353/7 |
| 8,523,673 | B1 * | 9/2013 | Boyd et al. ....................... | 463/34 |
| 2002/0029205 | A1 | 3/2002 | Pedraza et al. ................... | 706/21 |
| 2002/0120554 | A1 * | 8/2002 | Vega ................................. | 705/37 |
| 2002/0171637 | A1 | 11/2002 | Kadowaki et al. ............. | 345/204 |
| 2005/0055298 | A1 | 3/2005 | Czora .............................. | 705/35 |
| 2006/0074831 | A1 | 4/2006 | Hyder et al. ..................... | 706/45 |
| 2006/0149570 | A1 | 7/2006 | McDaniel et al. ........... | 705/26.1 |
| 2008/0010169 | A1 | 1/2008 | Dollens ......................... | 705/27.2 |
| 2008/0026838 | A1 * | 1/2008 | Dunstan et al. ................. | 463/30 |
| 2008/0256008 | A1 | 10/2008 | Kwok .............................. | 706/20 |
| 2010/0063862 | A1 | 3/2010 | Thompson et al. .......... | 705/7.29 |
| 2010/0191578 | A1 * | 7/2010 | Tran et al. ....................... | 705/10 |

(Continued)

FOREIGN PATENT DOCUMENTS

| | | |
|---|---|---|
| CA | 2794542 | 8/2011 |
| CA | 2794489 | 9/2011 |

(Continued)

OTHER PUBLICATIONS

Online video of virtualpresenter; http://www.youtube.com/watch?v=24U6iYYJFV0 uploaded Oct. 2, 2010, nuMedia innovations, Inc.*

(Continued)

*Primary Examiner* — Resha Desai

(57) ABSTRACT

A system, computer-readable product, and method for a display device are provided. An intelligent personal assistant is displayed to provide information to a user, for example, in a public space. Movement of the image shown as the intelligent personal assistant may be suppressed or restricted at various parts of the person's body, such as below a chin or above the eyebrow. In addition, the database may be provided that stores queries and replies to the queries so as to respond to the user's questions. The system could also notify personnel or staff if additional assistance is required.

19 Claims, 31 Drawing Sheets

(56) References Cited

U.S. PATENT DOCUMENTS

| | | | |
|---|---|---|---|
| 2011/0191681 A1 | 8/2011 | Stark | 715/716 |
| 2011/0238535 A1 | 9/2011 | Stark | 705/27.1 |
| 2012/0095853 A1* | 4/2012 | von Bose et al. | 705/16 |
| 2012/0206449 A1 | 8/2012 | Stark | 345/419 |
| 2012/0309520 A1* | 12/2012 | Evertt et al. | 463/31 |
| 2012/0321146 A1* | 12/2012 | Kundu et al. | 382/118 |

FOREIGN PATENT DOCUMENTS

| | | |
|---|---|---|
| CN | 102844738 | 12/2012 |
| EP | 1837830 | 9/2007 |
| EP | 2074911 | 7/2009 |
| EP | 2531912 | 12/2012 |
| EP | 2553647 | 2/2013 |
| JP | 2000/298544 | 10/2000 |
| JP | 2003-104554 | 4/2003 |
| JP | 2008-200256 | 9/2008 |
| KR | 10-0405988 | 11/2003 |
| WO | 02/057896 | 7/2002 |
| WO | 2006/047487 | 5/2006 |
| WO | 2006/115261 | 11/2006 |
| WO | 2009/032772 | 3/2009 |
| WO | 2011/120051 | 9/2011 |
| WO | 2011/127577 | 10/2011 |
| WO | 2011/127578 | 10/2011 |
| WO | 2011/097309 | 12/2011 |
| WO | 2012/106815 | 8/2012 |

OTHER PUBLICATIONS

Morganosky, M. A., & Cude, B. J. (2000). Consumer response to online grocery shopping. International Journal of Retail & Distribution Management, 28(1), 17-26. Retrieved from http://search.proquest.com/docview/210926102?accountid=14753.*

International Search Report dated Aug. 24, 2011.
International Search Report dated Aug. 15, 2011.
International Search Report dated Oct. 4, 2011.
International Search Report dated Oct. 31, 2011.
International Search Report dated May 24, 2012.
Online video of virtual presenter; http://www.youtube.com/watch?v=24U6iYYJFV0, uploaded Oct. 2, 2010, nuMedia Innovations, Inc.
J. L Hunt, B. G. Nickel, and Christian Gigault's paper "Anamorphic images" published in the American Journal of Physics, Mar. 2000, vol. 68, Issue 3, at pp. 232-237.
F. Leeman et al., "Hidden Images, Games of Perception Anamorphic Art Illusion", Harry N. Abrams, Inc., Publishers, New York, pp. 85-176 (1975).

* cited by examiner

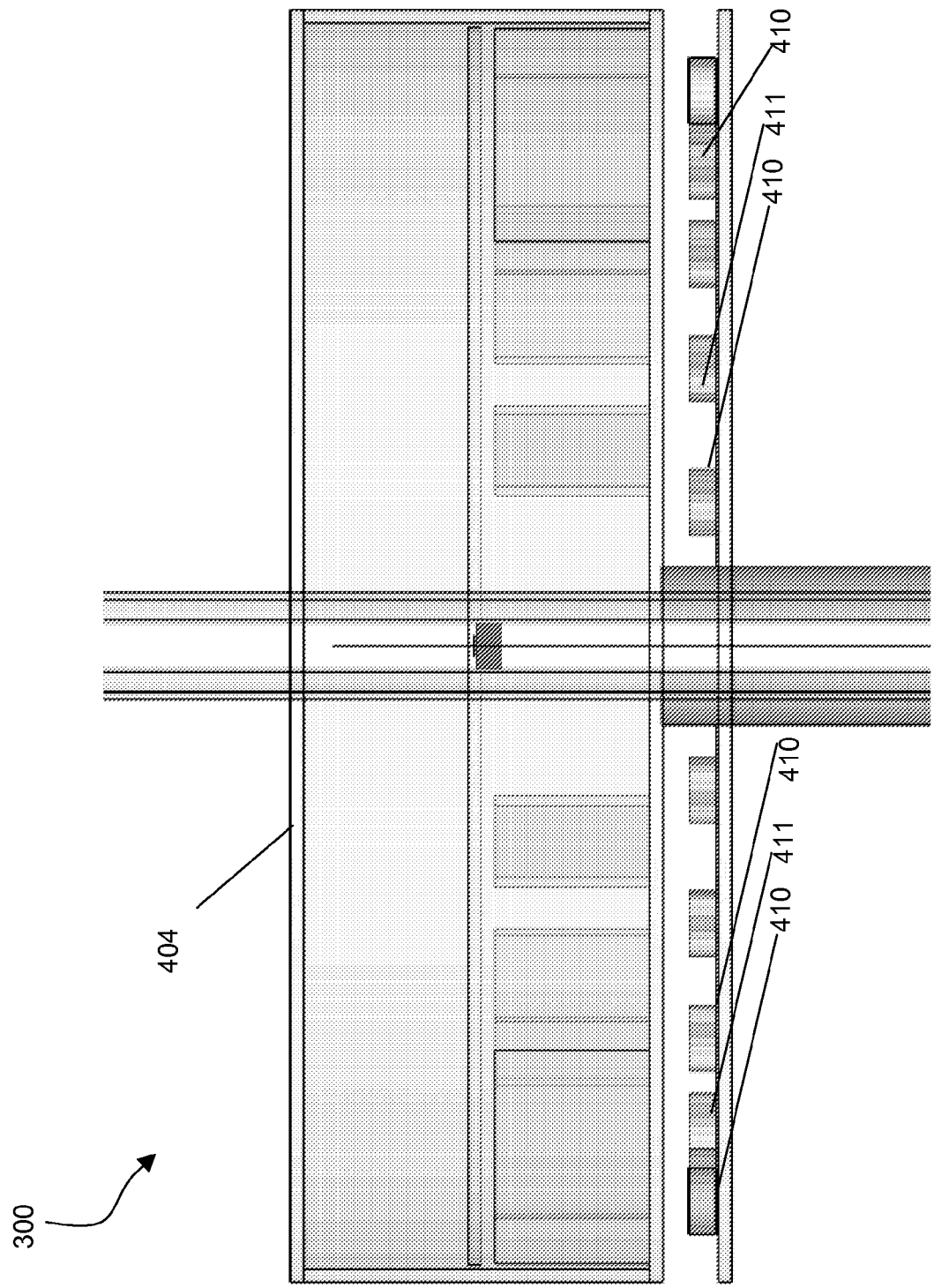

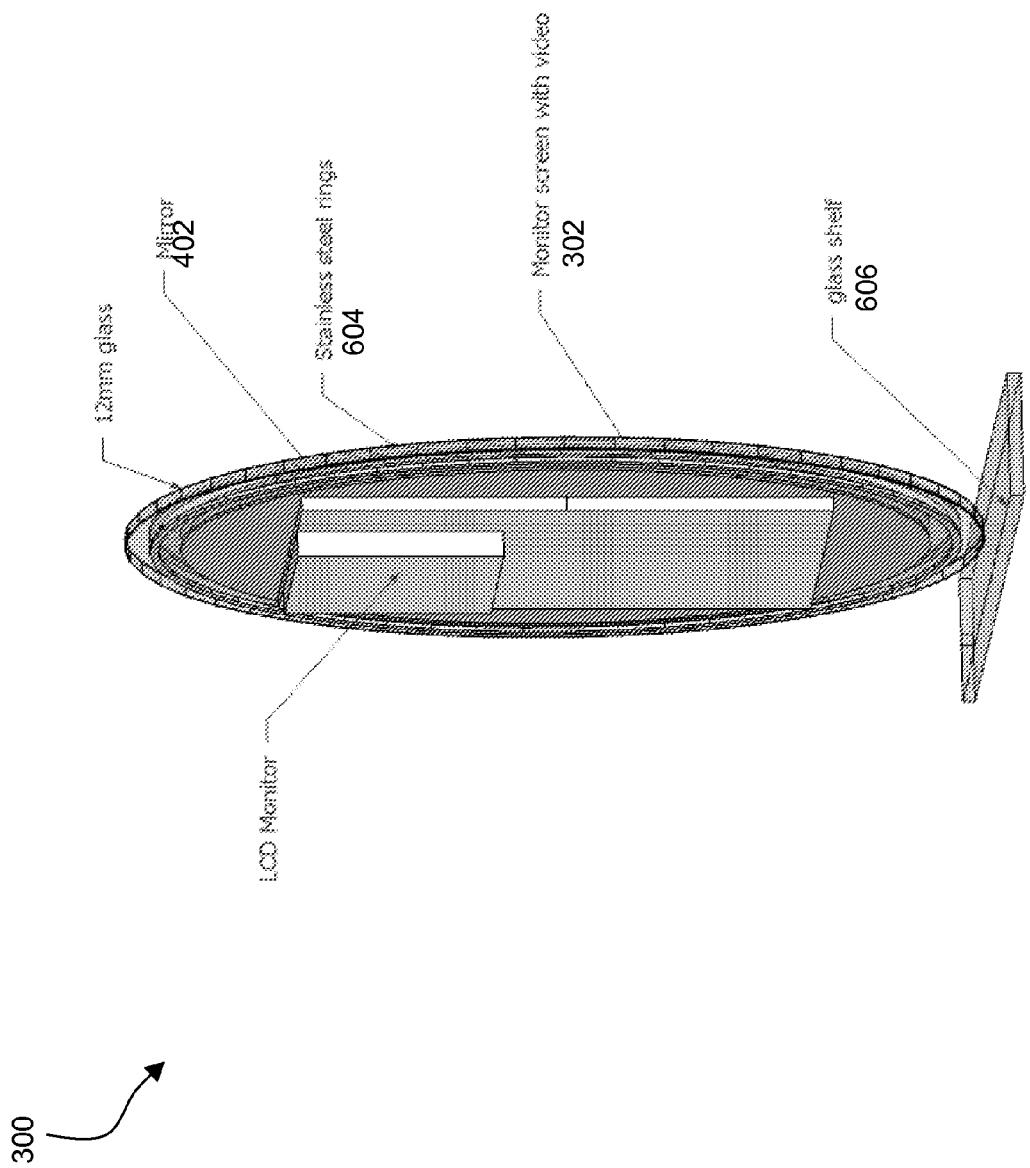

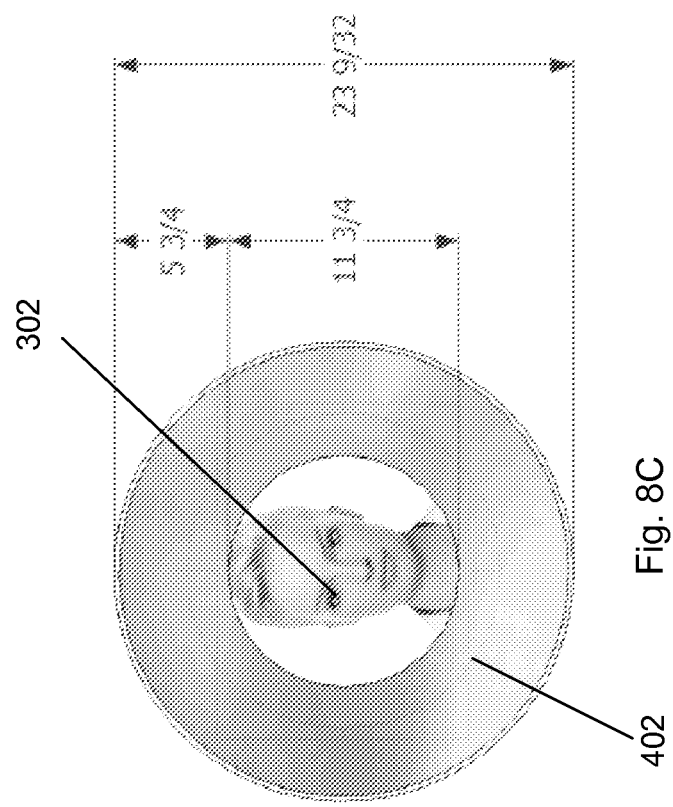

US 9,367,869 B2

SYSTEM AND METHOD FOR VIRTUAL DISPLAY

CROSS-REFERENCE TO RELATED APPLICATIONS

This application is based on and claims priority to U.S. Provisional Patent Application Ser. No. 61/607,898, filed on Mar. 7, 2012 and entitled "SYSTEM AND METHOD FOR VIRTUAL DISPLAY," which relates to U.S. patent application Ser. No. 13/372,428, filed on Feb. 13, 2012 and entitled "SYSTEM AND METHOD FOR VIRTUAL SHOPPING DISPLAY," the entire contents of which are incorporated by reference as set forth entirely herein.

BACKGROUND

1. Field

The present application relates generally to a display method, system and processor-readable medium controlling the display and, more particularly, to information distribution and/or product sales using an enhanced visual display of an image of an intelligent personal assistant that can interact with a user for setting up appointments, registering e-mail messages, phone numbers, flight numbers, and establishing a sequence of being serviced.

2. Description of the Related Art

Obtaining information associated with products and services, such as availability, use, warranties or the like may be difficult, particularly when information is only available in person, and in crowded areas such as department stores, or in areas where human assistance is limited or unavailable. Displays providing an image of a person that provides information to nearby users are known, but the image is often inelegant and fails to provide realism to a user interacting with it.

Also, shopping, particularly in large department stores, remains frustrating for many people. Information associated with one or more products, such as availability and use may be difficult to get, and shoppers often do not experience a product sufficiently before purchasing. The results are often product returns and frustration for the consumer.

SUMMARY OF THE DISCLOSURE

A method, computer-readable medium and system for a display device are provided, including a display that provides a human intelligent personal assistant ("HIPA").

The method of displaying the HIPA can be based upon a recording of an image of a person. The method may include rendering, as the personal intelligent assistant, the image of the person, including an image of the head and torso of the person and an image of restricted areas above eyebrows and below a chin of the person, wherein movement of the image of the person in the restricted areas is shown to be more static than actual movement of the person, while movement of a facial area of the image of the person, including between the eyebrows, is shown to be a realistic representation of the person.

The method may further include displaying the intelligent personal assistant to a user in a public space.

In the method, the displaying can comprise projecting the intelligent personal assistant onto a film medium, for example the medium may be positioned between two panes of glass.

The method may also include recording the image of the person; and motion tracking a body of the person during the recording so as to stabilize movement of the image. The method may also entail recording the image of the person; and placing dots on a body of the person so as to obtain a stabilized image to be used for the image.

The restricted areas need not include an area below the belt line of the person. The restricted areas need not include areas showing movement of hair and breathing of the person. The movement of the image in the restricted areas can be shown to be more static by only occasionally rendering movement in the restricted areas but not all movement in the restricted areas.

The method may also entail detecting an image of a user at or in a vicinity of the intelligent personal assistant; and matching, using automated facial recognition processing, the image of the user to a previously stored user image; and when a match is found, notifying an attendant of the match.

The method may also include: obtaining an image of a product or a product's bar code or machine-readable feature; and identifying the product and providing to the user information about the product.

The method can further comprise receiving payment from the user by a machine reader reading a credit card of the user for the product displayed.

The method may include detecting a presence of a user when the user is in close proximity to the intelligent personal assistant, the detecting accomplished using infrared signal technology, ultrasound technology, or image detection. Also, the method may entail: detecting the number of people in a line; determining that the number of people in a line exceeds a predetermined threshold member; and displaying the intelligent personal assistant when the number of people detected in a line exceeds a predetermined threshold number.

In the method, the intelligent personal assistant may be accompanied a voice, provided by a speaker, of the intelligent personal assistant that greets a visitor, wherein the method can include, based on user identification information obtained from the user, providing product or service information to the user.

The method can comprise recognizing the presence of a user based on cell number or text message from the user; providing information to the user in accordance with the user's identity obtained for product of service; and notifying a product of service provider of the presence of the user.

The method may comprise: receiving product or service information from a medium provided by a user; identifying automatically the user and the product or service based on the information received; and based on the identified product or service, providing product or service information to the user.

The method further can include: identifying a product associated with a user in a vicinity of a display of the intelligent personal assistant; and rendering the image of the intelligent personal assistant and the identified product. The intelligent personal assistant may be accompanied a voice, provided by a speaker, of the intelligent personal assistant, and the method may also entail providing automatically to a user product or service information or directions responsive to an identification of the user.

In accordance with an embodiment, a plurality of 2D/3D image displays are arranged for a person to obtain information associated with a product and/or service. Each of at least some of the displays respectively provides information associated with a particular product and/or service. For example, one display of the plurality of displays shows a picture of a portable media device and another of the plurality of displays shows an image of furniture, such as a couch. Yet another 2D/3D image display shows an image of perfume. The respective 2D/3D image displays may be configured in one or more various shapes, such as oval, round, rectangular, square, diagonal, or the like. Thus, a plurality of unique and eye catching shapes of the 2D/3D image displays are provided in one or more embodiments.

Also disclosed is an image display that displays at least one image of at least one of a product and person is coupled to a support structure, and at least one shelf may be operatively coupled to the support structure. Further, at least one database stores a plurality of queries and replies to the queries, and at least one processor is provided that is operatively coupled to the database. The processor(s) programmed and configured to receive from the database at least one reply to a first query. The processor is further configured to transmit at least one instruction to the display for rendering a plurality of images of the person, wherein the rendered images of the person include providing the at least one reply to the first query.

Features and advantages of the present application will become apparent from the following description of the invention that refers to the accompanying drawings.

BRIEF DESCRIPTION OF THE DRAWINGS

For the purpose of illustrating the invention, there is shown in the drawings several forms which are presently preferred, it being understood, however, that the invention is not limited to the precise arrangements and instrumentalities shown. The features and advantages of the present invention will become apparent from the following description of the invention that refers to the accompanying drawings, in which:

FIGS. 4A-4F illustrate example embodiments of a virtual shopping display in accordance with the present application;

FIGS. 6A and 6B illustrate an alternative embodiment of a virtual product display in accordance with the present application;

FIGS. 8A-8E illustrate example embodiments of the present application and illustrate one or more mirrors provided in one or more different sizes and lengths;

DESCRIPTION OF EMBODIMENTS

Figure 1:
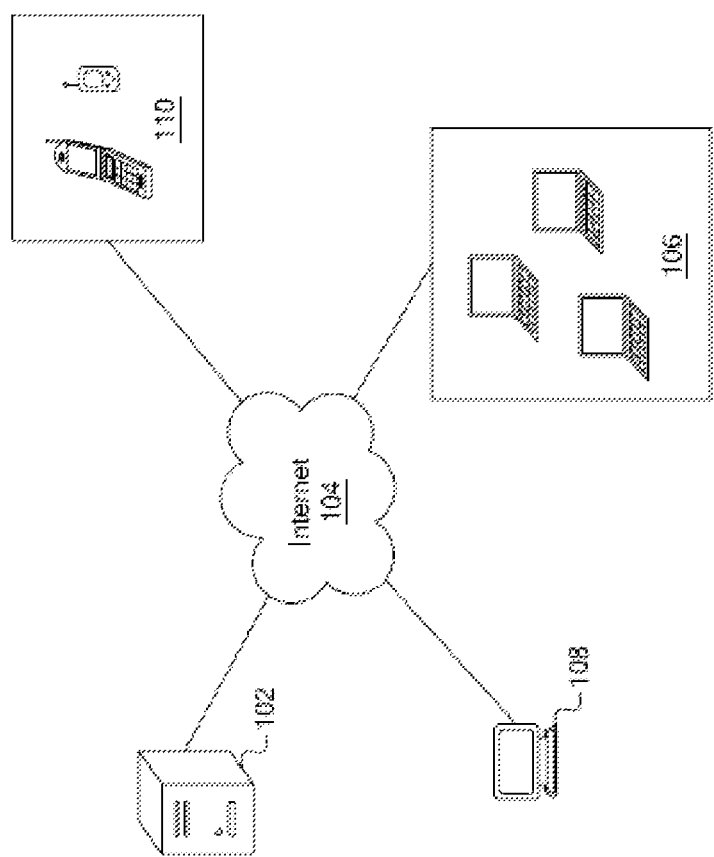
FIG. 1 illustrates an example hardware arrangement, in accordance with an embodiment of the present application.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment, and such references mean at least one.

Reference in this specification to "one embodiment" or "an embodiment" means that a particular feature, structure, or characteristic described in connection with the embodiment is included in at least one embodiment of the disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

A 2D/3D image display, provided as a projected image or on another type of display, that show information about respective products and/or services and a human intelligence personal assistant, which may be a virtual full-sized person can be provided. In an embodiment, the HIPA is rendered to provide a very realistic virtual representation of a person. Movement of the HIPA that may occur below the chin and above the eyebrows may be restricted to appear fairly static.

In an embodiment, this is provided via motion tracking, which is used to stabilize movement associated with the person being represented. In an embodiment, some portion of the HIPA may move slightly, such as to show breathing and movement of hair.

Moreover, movement below the belt line may also be shown to provide a realistic representation of a live person. Moreover, movement of the HIPA that occurs in the facial area is not restricted. As a person is being photographed for rendering, for example, dots are placed on the person's head, and/or other parts of the body are used for stabilizing purposes.

By illustrating a large part of the person's body without a lot of movement, while showing movement within facial portion, the HIPA appears very realistic. In an embodiment, only occasional movements, such as a slight movement of an elbow or movement of a few strands of hair, occur. In contrast, movement that occurs between the eyebrows and the chin occur regularly and frequently, such as associated with typical movements of a human face. In this way, eye movement, mouth movement and the like occur regularly and fairly frequently, providing a realistic representation of a person. The contrast between relatively static amounts of movement of the majority of the body with simultaneous movement of the person's face provides a very realistic representation of an actual human being. An example of this is provided in FIGS. 14 and 15. Moreover, stabilization allows the HIPA to appear not to move in and out of a projection area, and thus appear more realistic, as well.

As noted above, in an embodiment a plurality of 2D/3D image display screens are provided that respectively display information (e.g., image(s)) of products and/or services. A person at or near the respective displays selects one of the displays by approaching and/or touching the display. In an embodiment, full two-way 2D/3D image display screens and/or two-way HIPA are provided, and include microphones, speakers, cameras and/or other input/output devices. One or more cameras may be positioned below the lens of one or more projectors to provide for alignment and monitoring remotely. Once selected, the HIPA may provide information about the respective product or service shown in the selected 2D/3D image display. The HIPA may also interact with the user, such as by responding to questions, receiving purchase information, or the like.

In an embodiment, the HIPA may also use fingerprint, facial recognition, voice and retinal scanning to identify the presence of a person, as well as to offer service and/or surveillance services. The HIPA may be used in public and private areas to record people's faces, such as at a five to six foot level, and appear to be looking straight which provides a superior angle than known security surveillance cameras. Moreover, the HIPA may be used to identify people or threats in public areas, including, for example, entrance and exit ways, and facial recognition may be provided to detect unwanted people. Moreover, video feeds may be transmitted to one or more other systems. In an alternative embodiment, the HIPA may process and notify a particular and highly qualified salesperson that a good customer has arrived, or may notify security that a repeat shoplifter has returned. In a retail or service environment, such as in a department store, the HIPA may be used to provide assistance when a customer provides a barcode or other machine readable code, and the HIPA may identify the associated product and/or service, and provide detailed information associated therewith. Other information provided in response to a barcode or other machine readable code may be that the HIPA expresses a particular opinion, offer complimentary products, offer coupons, show product or service comparisons, provide user or industry reviews, tweets or other types of postings.

In an embodiment, the HIPA may be used to check people out of a store and/or function as a self-service cashier. The HIPA may replace a human being behind a counter in one or more business or service environments, including by using a small display unit or a full size display unit showing various forms of capabilities or with HIPAs to aid communication.

In an embodiment, user motion is detected as the user approaches or is in close proximity to a respective 2D/3D image display, such as via infrared signal technology, ultrasound technology, image and/or video detection or other suitable way. Upon detection, the respective 2D/3D image display is selected, and information regarding the product and/or service shown therein is provided by the HIPA and/or one or more 2D/3D image displays. In this way, users do not have to come in physical contact with one or more devices in order to receive product/service information. Users may also put their hands on any device that is near a 2D/3D image display and/or the HIPA and the location of the movement will be ascertained, such as via triangulation, and the movement may be associated as a signal to associate the image or text on the respective area that had movement nearby. Thus, a "near-touch" technology is provided in accordance with the present application that effectively enables customers to view custom and personally tailored information about one or more products and/or services.

In an embodiment, a projection film, such as the VIKUITI rear projection film is embedded in two clear panes such as glass, thermo panes, plastic, lexan or other suitable material. By providing the film within two panes, the projection film is protected and does not scratch and also protects the film from the elements. Further, the panes of glass with the embedded projection film may be molded with stainless steel that provides both industrial strength and attractiveness.

Examples of 2D/3D display screens and a HIPA are illustrated in Appendix A. A4 shows an example projection device associated with the HIPA.

The present application is applicable in many environments and settings, particularly in places where people congregate for various reasons. Example embodiments in connection with the teachings herein are now provided below.

The present application is suitable in the context of a banking premises, such as at a branch office. In an embodiment, one or more cameras are provided for tracking and detecting people. As a person enters a bank, the person is detected and the HIPA, or other suitable virtual representation of a person, welcomes the person to the bank and offers assistance. In an embodiment, as tracking technology detects that a predetermined number of people are present at any given time, various kinds of information may be provided. For example and in the context of the bank, when a bank line exceeds a certain number of people, the HIPA in close proximity to the line announces that the branch manager or other appropriate personnel have been notified that the line has grown and that additional personnel have been summoned so that additional lines can open. In this way, improved customer service and customer relations is provided in accordance with the teachings herein. The HIPA may also provide additional information about banking services, and may have touch or near touch functionality to allow customers to request specific information.

In another embodiment, a retail shoe store is configured with a plurality of 2D/3D displays and/or a HIPA substantially as described herein. As a person approaches one or more of the respective 2D/3D display screens showing shoes, the respective display becomes selected and the HIPA provides information associated with the particular shoe style that is displayed in the selected screen. Unlike prior art shoe stores that physically display samples of shoes, dozens of styles of shoes may be displayed in the respective 2D/3D image displays, and as one or more is selected by a user, the HIPA provides details of the selected shoe and sizes available. Moreover, options may be provided in the respective 2D/3D image display for requesting a salesperson to bring out a particular shoe in a particular size for physical observation.

In an embodiment, the HIPA may be used in conjunction with various wireless payment systems, such as available via cellular telephone and other smartphone technology. The HIPA may offer a service (i.e., buying music in a mall setting, transferring funds from a cell phone or other account, paying a bill), or the HIPA act as an interface for an automated teller machine ("ATM"). Instead of a conventional ATM, the HIPA enables people to enter personal information numbers ("PIN"), speak their PIN out loud, or may use other technology, such as a retina scanner, to confirm identities. The HIPA may also have a magnetic strip or smart chip reader incorporated therein, or may use facial recognition, voice recognition or may simply ask a user to respond to a series of questions to verify identity.

In an embodiment, the HIPA is configured with gigabit Wi-Fi capacity. The HIPA may operate as a kiosk to provide information sent or received from a user's smartphone or other mobile device. Moreover, the HIPA may transmit information to a user's smartphone or other mobile device. In another embodiment, the HIPA may be usable to make phone calls, such as via SKYPE or other voice over Internet Protocol technology. The HIPA may be configured for communication via Wi-Fi, BLUETOOTH, Near Field Communications ("NFC") or other suitable communications protocol. The HIPA may also provide calling service using a localized speakerphone, and/or offer Wi-Fi or BLUETOOTH calling within a certain zone. This is very beneficial in heavily populated areas or other areas where obtaining a communications signal is difficult, such as subways and other dense commercial areas that have poor cellular service reception. This is also helpful for people who do not have a telephone, and for users whose mobile communication devices are not working, such as due to a spent battery.

Moreover, the HIPA may be usable in museums, galleries, and/or any public area to display popular information and offer a method to seek assistance, such as a function of two-way communication.

In an embodiment, the HIPA is configured as a three-dimensional format. Moreover, the HIPA may be operable to access a user's computing device, such as a desktop computer, and may provide a user to access to the user's computer, as a function of the HIPA's bandwidth and one or more 2D/3D displays.

In another embodiment, a retail store that sells greeting cards is configured with a plurality of 2D/3D image displays and/or a HIPA, substantially as shown and described herein. The user may interact with one or more of the 2D/3D image displays to select a particular occasion, such as a birthday, holiday or other occasion, and after the selection of an occasion is received, a plurality of particular cards are shown in the 2D/3D image displays. The consumer may make several selections and design his/her own customer card and the HIPA will have the card printed at a designated location. The consumer may select one or more of the 2D/3D image displays showing the cards, and the HIPA may provide additional information about the selected card, such as to describe the image on the card, where the card was made or represents or the like. In this way, thousands of greeting cards may be represented for consumers in a relatively small amount of space, as opposed to prior art greeting card displays that require considerable amount of space. Moreover, by providing greeting cards in a virtual environment, the risk of damage to individual cards is eliminated.

In another embodiment, a retail store that sells cellular telephone and other mobile technology is configured with a plurality of 2D/3D image displays and/or a HIPA, substantially as described herein. In this embodiment, a plurality of cell phones are displayed in the 2D/3D image displays and one or more of the displays may be selected, for example, by a user touching or coming into close proximity to a respective display. Thereafter, the HIPA may display a larger image of the selected device and may discuss features of the selected mobile device. As a user indicates that he or she would like to see a physical sample of the device, the HIPA may notify staff at the retail store to access the particular device and to bring it to the user.

In another embodiment, a general department store, such as a large store, is configured with a plurality of 2D/3D image displays and/or a HIPA, substantially as shown and described herein. As a customer enters the front door of the store, he or she may be welcomed by the HIPA and the HIPA provides various kinds of information. For example, the customer may be informed of store specials that are occurring, or may be referred to a concierge desk or to a store directory for location information concerning respective products. The store directory may be displayed by the HIPA or on one or more respective 2D/3D image displays. In an embodiment, the customer makes a selection of a respective department that is presented by the HIPA and/or in 2D/3D image displays, and product information that is located in the respective department is presented on the plurality of 2D/3D image displays. This enables the user to "drill down" through a virtual representation of the store to locate particular products easily and quickly.

In another embodiment, one or more locations in an airport are configured with a plurality of 2D/3D image displays and/or a HIPA, substantially as shown and described herein. For example, AMERICAN AIRLINES provides flight numbers for flights that are arriving and departing at the airport are displayed in the 2d/3d image displays and/or the HIPA. The HIPA may prompt a user to select a particular flight or, alternatively, enter a flight number into a graphical screen control, such as a text box, touch pad or other input means, or to transmit a number via a cellular telephone or other mobile device. In addition, a user may be prompted to submit personal identification information, such as the customer's cellular telephone number, last four digits of social security number, or other identification information. The HIPA may use the information submitted by the person to welcome the person, check the person in, provide a boarding pass, and to provide flight information regarding status, updates or the like. In an embodiment, the user is informed that a message will be transmitted, for example, via SMS, e-mail or other suitable protocol, with updates and corresponding flight information. This enables the user to venture through the airport without a requirement of going through security and physically waiting at a departure terminal or other fixed location at the airport. In accordance with the present application, the person can enjoy various amenities offered at the airport, such as to visit shops, restaurants and/or other locations, without any fear of missing a flight.

In an embodiment, a user registers his/her smartphone (or other mobile device) with the HIPA, and the HIPA detects the smartphone, such as by ID number, phone number, MAC address or other suitable identifier, and automatically acknowledges the user's presence, which can be done using GSM, SMS, BLUETOOTH, NFC or other suitable means. When the user approaches the HIPA, the user is welcomed. As described herein, this is useful as the user is near the doctor's office, airline lounge, pharmacy or other location, the user is automatically identified, and the HIPA may notify appropriate personnel. This provides almost immediate service and allows the service provider (e.g., doctor, office, bank, retailer, or the like) to be notified of your presence. Moreover, in one or more embodiments, the user may submit payment of a good or service (including food/drink) in connection with the HIPA.

In an embodiment, a cellular telephone/PDA application is provided that allows a user to generate a selection of product (s) or service(s) that are then either transmitted to the product or service provider by cellular data, Wi-Fi, BLUETOOTH, or other suitable means. An image of a 2d or 3d barcode may be displayed on the cellular telephone/pda display that is scanned by video for a quick order device. Thereafter, the corresponding service or product that has been encoded into the barcode is ready and the product or service is provided to the customer.

In another embodiment, an office building is configured with a plurality of 2D/3D image displays and/or a HIPA, substantially as shown and described herein. For example, the lobby of an office building includes the HIPA, which welcomes the person who enters the building and prompts the person to submit personally identifiable information, as well as some identification of the office where the person is going. As information is received from the person, such as the first few letters of a company name, the location in the office, such as floor and unit number are displayed. Moreover, a message, such as via SMS, e-mail or other suitable protocol may be transmitted to the respective office to announce that the person has arrived and is on his or her way to the office space.

In another embodiment, a pharmacy, such as a prescription drop off and pick up location, is configured with a plurality of 2D/3D display screens and/or a HIPA substantially as shown and described herein. A person who has a medical prescription to pick up or drop off at a pharmacy has the option, in accordance with an embodiment, to register using the HIPA and/or at least one 2D/3D image display screen, for example by submitting identifying information. For example, the user submits a cellular telephone number, last four digits of social security number or other personally identifying information. Additionally, the prescription may be scanned or otherwise obtained electronically and once received, the user is notified that a message will be transmitted to the user when the prescription is ready for pick up. For example, the user is notified that a text message, e-mail or other suitable message format will be sent, and the user is able to continue shopping through the store. In one embodiment, a plurality of messages are transmitted, such as a first message that indicates a prescription will be ready in five minutes, and a second message indicating that the prescription is ready for pick up. Moreover, if a user does not respond to a text message, the HIPA may instruct the store intercom system to page the user alerting him or her that the prescription is ready. When the user arrives at the prescription pick up location, the user may be prompted to submit some information, such as a code, that was transmitted to the user via the text message. Once entered, the prescription may be retrieved and delivered to the user.

In another embodiment, a physician's office is configured with a plurality of 2D/3D image displays and/or a HIPA, substantially as shown and described herein. When a person arrives at the physician's office, the person may be greeted by the HIPA and prompted to enter insurance information, display a health card that contains insurance information, or to submit other personally identifying information, such as a cellular telephone number, last four digits of social security number or other personally identifying information. Once received, the person may be notified that he or she is checked in and that the doctor will be alerted. It is recognized by the inventor that some doctors will see patients out of the respective ordering which patients arrived at an office, for various reasons. For example, one person's medical condition may be more acute than another's, which causes a doctor to see that patient sooner. In accordance with the present application, the doctor is notified that a particular patient has arrived, and they further identify the particular ailment or condition of the patient and the doctor may send an instruction to the HIPA alerting the HIPA to have the patient seen immediately.

In another embodiment, the present application is particularly useful as an appointment maker. A user may submit a message, such as via text, e-mail, telephone call or other suitable means to make an appointment and an interface is provided to receive the information, and send the information to the particular place where the appointment is being made in order to schedule the appointment. The receiving facility may send confirmation information back to a device associated with the present application, such as a computing device or other suitable device that the appointment has been made and scheduled. The present application includes transmitting one or more messages to the user notifying the user that an appointment has been made and reminders may be automatically sent to the user as well as options for the user to cancel and/or reschedule an appointment. Moreover, as a person makes his or her scheduled appointment, one or more 2D/3D image displays and/or a HIPA substantially as shown and described herein may be provided at the location to receive identifying information about the user, such as the user's cellular telephone number, last four digits of the social security number or other personally identifying information. Thereafter, a message may be delivered to appropriate personnel that the user has arrived and is present for the appointment.

Thus, a plurality of embodiments are shown, described and envisioned, as the present application is suitable in many environments. For example, a plurality of 2D/3D image displays and/or a HIPA may be provided at a car dealership, at a gas station, at a furniture store, and countless other locations.

The method according to an aspect of Applicant's invention will be described below with reference to FIGS. 18A and 18B of the Drawings. A person whose images are to be recorded, such as a model, is positioned before one or more recording media, such as video cameras or digital video cameras or the like. Dots may be positioned on the face and on various parts of the rest of the person's body, as discussed at step 811 of FIG. 18A. In this way, motion tracking of the person's body and movements of the person may be facilitated, and motion tracking is performed as discussed at step 812 of FIG. 18A.

Figure 18A:
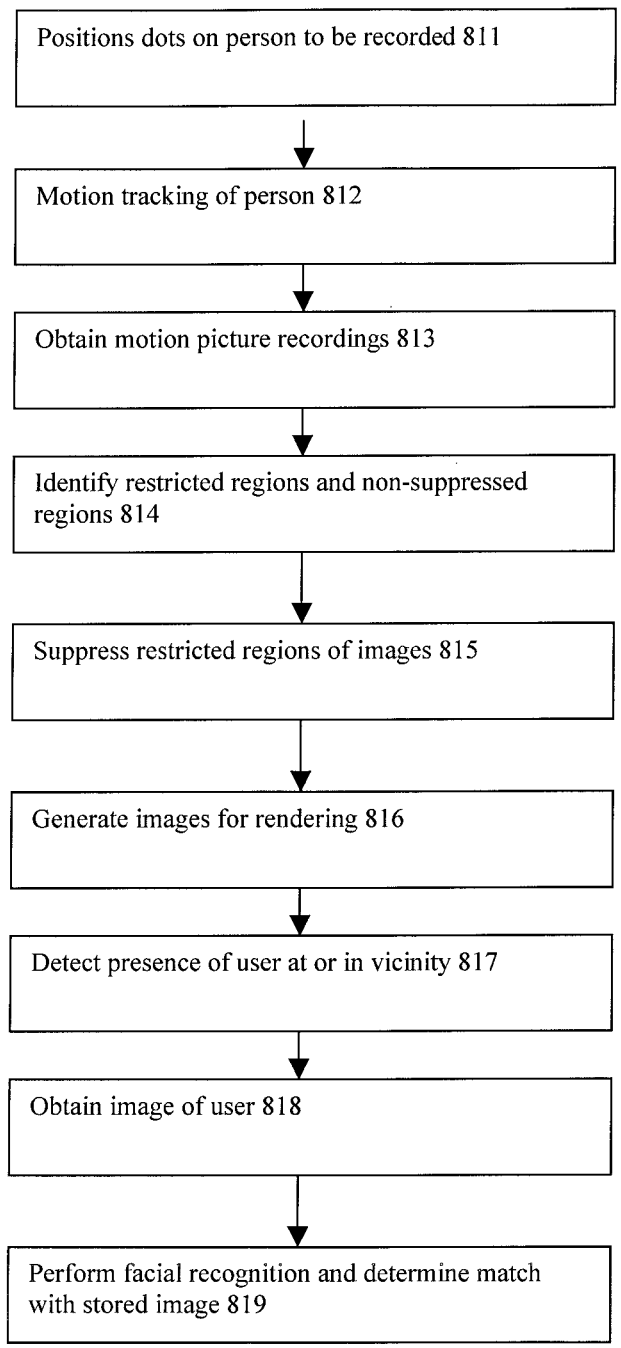
FIGS. 18A and 18B is a flow chart showing an example of a method according to the present disclosure.

A series of images or motion picture recordings are obtained, as shown in step 813 of FIG. 18A. For example, a person may articulate various words or sounds or phrases so that the intelligent personal assistant image may seem to pronounce a repertoire of words of a given language such as the English language, as needed to interact with a user at the display device. It will be understood that other languages may also be used, such as Spanish, French or other languages.

Figure 14:
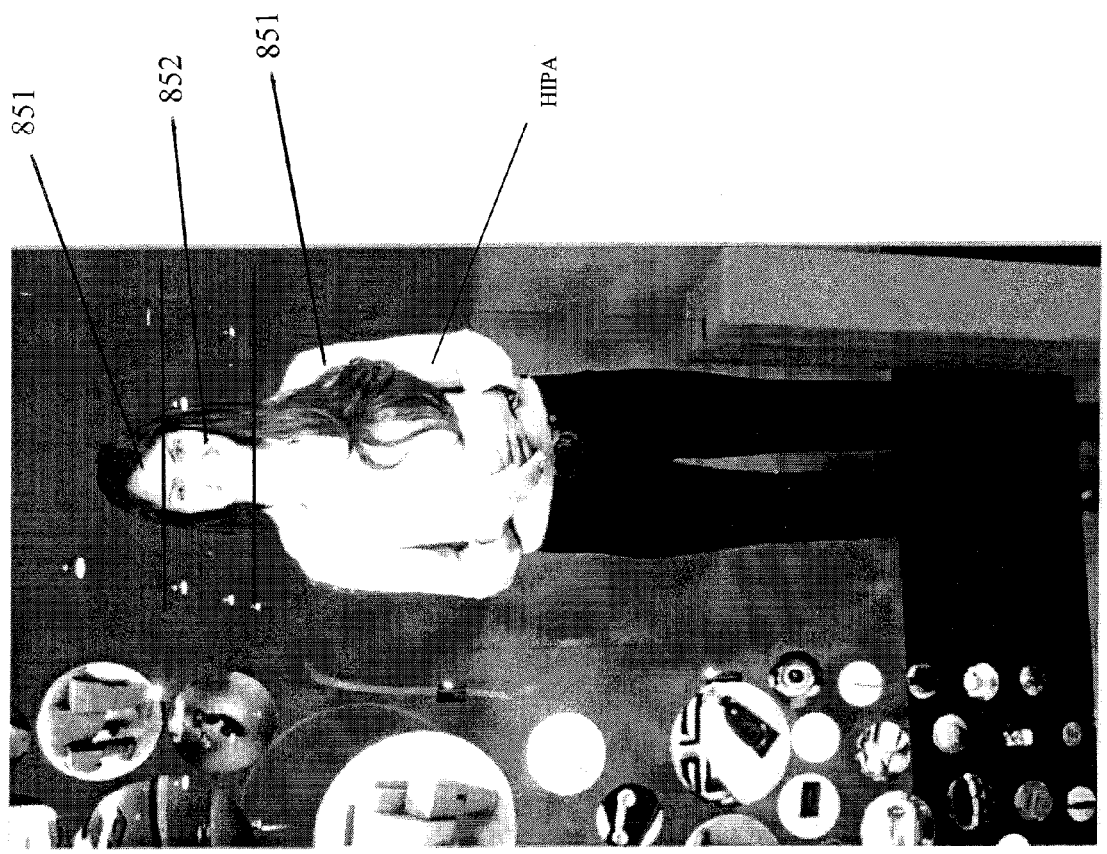
FIGS. 14 and 15 illustrate an example of depiction of movement of the person's face contrasted with restricted movement of the rest of the body of the person, according to an aspect of the disclosure.
Figure 15:
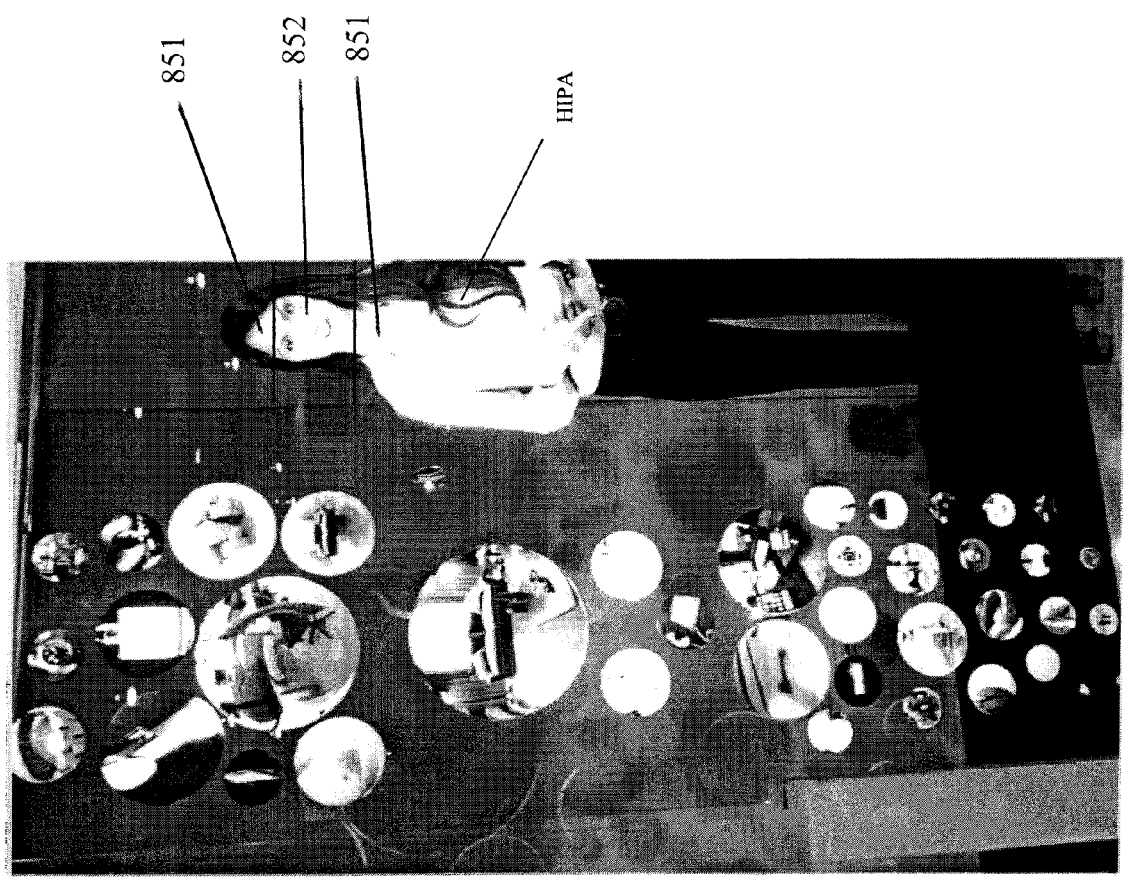
Figure 16:
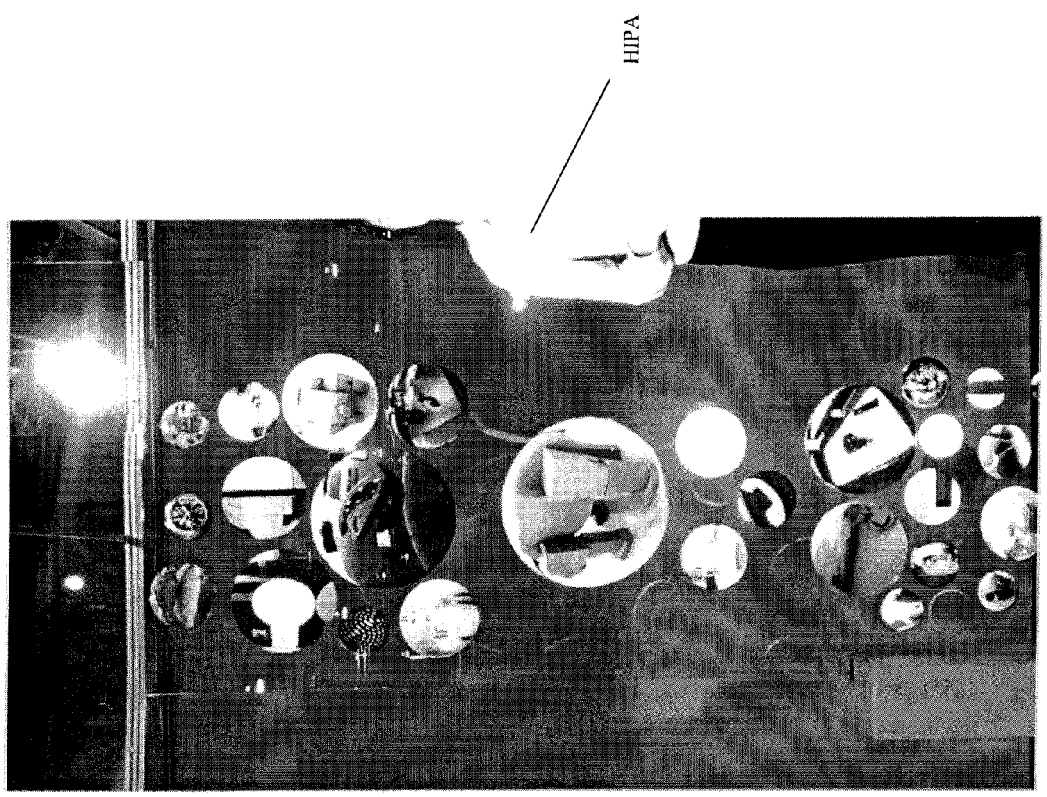
FIG. 16 illustrates an example of the intelligent personal assistant together with products that are displayed together with the intelligent personal assistant, according to an aspect of the disclosure.
Figure 17:
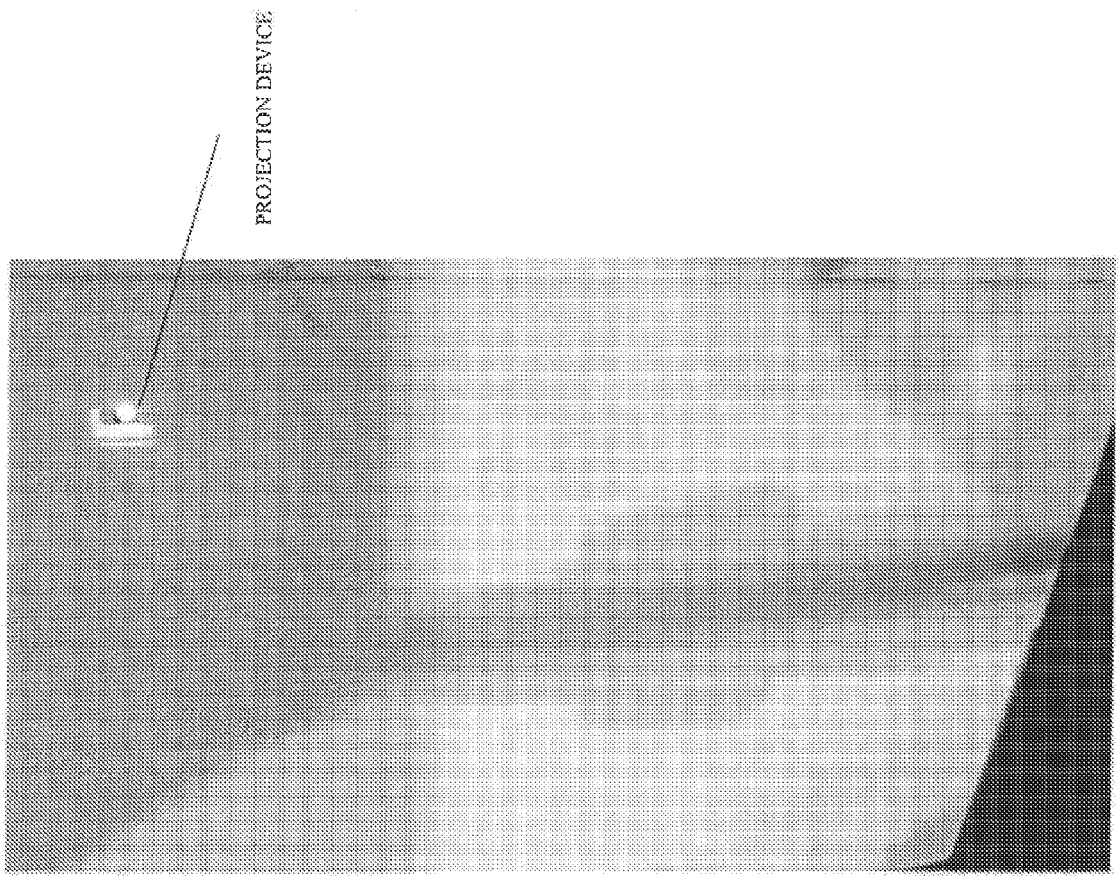
FIG. 17 shows a projection device for generating the image of the intelligent personal assistant, according to an exemplary embodiment of the present disclosure.

As shown in step 814 of FIG. 18A, in the images obtained, restricted regions and non-restricted or non-suppressed regions are identified automatically or manually by an editor. For example, as illustrated in FIGS. 14 and 15, suppressed regions 851 may include portions of the face above the eyebrow line. According to an aspect of the disclosure the portion of the face between the eyebrows and the eyebrows themselves are non-restricted regions 852. Also, portions of the body below the chin can be restricted. However other areas, such as the face may be shown so that the contrast between the restricted regions where motion is suppressed and the non-restricted regions, including the face, is accentuated and a more stable image can be rendered.

Portions of the region below the chin, such as hair or portions of the body where breathing motions occurs, are not suppressed, according to an aspect of the disclosure, so that a more realistic image may be provided. Similarly, portions of the head above the eyebrow line, such as portions of the hair moved by ambient air currents or by artificial air blowing machines, also need not be suppressed according to an aspect of the disclosure. Also, portions of the body below the belt line, such as the shifting of weight from one leg to the other or the shuffling or moving of the legs or feet, need not also be suppressed or restricted according to an aspect of the disclosure. Then, as illustrated in FIGS. 14-17 and as mentioned in FIG. 18A, step 815, restricted regions of the images are suppressed and images for rendering are generated at step 816 of FIG. 18A.

The intelligent personal assistant rendering device, and a projector for projecting the image may be deployed in a public space. For example, a rear-projection projector may be employed so as to project the intelligent personal assistant in a public space so that when a user approaches the intelligent personal assistant may be projected to the user. For example, the user's presence or the user's mobile cell phone, handheld device, laptop device, credit card or other aspects of identifying information may be obtained when the user is in or at or in a vicinity of the device as discussed at step 817 of FIG. 18A. An image of the user may be obtained at step 818 and facial recognition may be performed to determine a match with images of a number of users stored in a database at step 819. Thus, a known shoplifter or other type of criminal, or a valued or repeat customer may be identified so that a clerk or security personnel may be automatically notified, as appropriate. For example, a camera may be mounted near or under the projector so that the image of the user may be obtained.

Figure 18B:
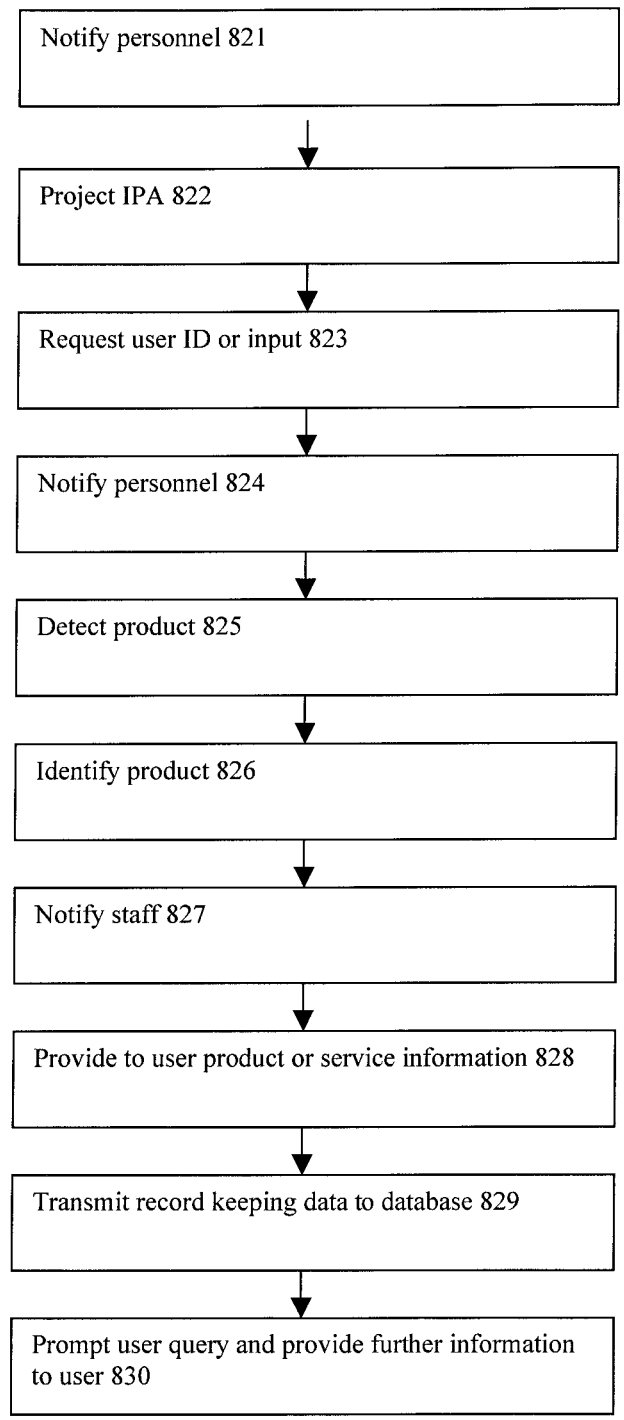

Personnel may be notified at step 821 illustrated in FIG. 18B that a user of interest is at the given location of the intelligent personal assistant. The intelligent personal assistant is projected for the user at step 822 of FIG. 18B. The user may be prompted to enter ID, such as a credit card, retinal detection, fingerprint or the like, or the user may be asked to enter his or her name or identification information on a keypad or on a cell phone of the user for transmission to the computer associated with the intelligent personal assistant, as described at step 823 of FIG. 18B. At this point, personnel may be notified ate step 824 that a particular person has arrived. For example at a doctor's office, a patient visiting may be prompted to enter his or her information or may be prompted to send identifying information, such as a cell phone number or a text message to the system, and then a person that may be notified that the patient has arrived.

Also, the user may then enter additional information such as insurance information. Similarly, a pharmacy, a customer may enter prescription information at this juncture as prompted by the intelligent personal assistant and the prescription may be scanned and notified to a pharmacist. The insurance information, prescription, or flight itinerary, ticket, boarding pass or other paper, plastic media associated with a product or service may be held by the user and scanned by the system. The user may be notified when the prescription is ready via text message sent to the user's phone or be an announcement of the intelligent personal assistant or the like. A lobby of a building that receives visitors may be equipped with an intelligent personal assistant so that the user can announce or otherwise provide identification information or the system may obtain from the user identification information automatically, such as by detection of the user's cell phone, credit card or the like. Other examples are also provided in the accompanying disclosure.

Similarly, a product held by a user in a department store may be detected, at step 825 of FIG. 18B. For example, the system may detect a barcode associated with a product held by the user, associated with a tag of the product held by the user, or may use image recognition to detect the product or at least the type of product the user is holding or is looking at. Then at step 826, the detected product is identified and matched to the model number or other tracking information of the retail establishment, store, facility or the like where the user is located. For some products, staff may be notified as illustrated in step 827.

In an airport setting, the intelligent personal assistant may be provided to passengers who are detected at step 822, and the passengers may be requested to provide user ID or flight information or the like using a portable device, handheld device or phone or using a keypad or keyboard provided at the kiosk of the intelligent personal assistant. Flight information may then be provided to the user, including gate information and the user may pay for the product, such as the flight by interacting with the intelligent personal assistant. For example, an intelligent personal assistant may include a credit card reader or may use a camera to scan in credit card information that is to be processed for paying for the flight. Product information may also be provided to the user or information about the service, such as an airport or a doctor's office or a hotel or the like may be provided to the user as discussed at step 828. Then, record keeping date may be transmitted to the database, as shown in step 829, for example, to maintain a number of users who are interested in a particular kind of product, have used the intelligent personal assistant, or are passing through a lobby or the like. The user may then be prompted to request further information about various products or services, and then the system can provide further information to the user responsive to the inquiry of the user as discussed at step 830 of FIG. 18B. For example, the intelligent personal assistant can explain aspects of the product or service, highlight desirable features of the product or service, provide instructions for using a product or service to a user, or provide directions, including room, gate, door, or floor information, route information, or the like.

According to another aspect of the disclosure, in an embodiment, a virtual shopping display is provided with one or more display devices that enable users to view one or more images, such as a 2D/3D images, of a product or a series of products. The image(s) may appear as individual images and/or video. In one or more embodiments, audio and video content are provided. Moreover, a plurality of images may be overlaid to appear as a single, two or three-dimensional image. Alternatively or in addition, one or images may be of a person, avatar or other representation of someone. The image(s) may be used to advertise the particular product or series of products. Two or three-dimensional images are preferable for being highly realistic, such that the viewer will be convinced that a representation of a person, product or other form is actual and not virtual. In an embodiment, the image(s) are rendered using OpenGL or other suitable graphics code.

The image(s) displayed may be of at least a portion of a person (e.g., just a head that appears to be reflected in a mirror), and may include a recorded video of the head selling a particular product. Preferably, the image(s) are geared towards one or more specific products that are provided at or near the virtual product display. For example, the 2D/3D images may be of a young attractive female or male face in connection with a product that young people may desire. Alternatively, the image(s) may be of an elderly person, such as a grandmother in connection with cooking products, or may be a young girl or boy in connection with children's toys. Thus, the face that appears in the virtual product display is preferably provided in the context of a particular product that an individual has demonstrated some interest in. In effect, the context of a respective face depends at least in part on a product that is being offered for sale. The 2D/3D image(s) may also be talking or be non-talking or simply an animation, although it is believed by the inventor that speech accompanying video images adds to the level of realism and the likelihood that a product will sell.

In an embodiment, a plurality of different products (such as perfume-related products) may be arranged around a 2D/3D image display and be placed on lit-up platforms. The products may either be 2D/3D representations of products or they may actually be physical products themselves that the customers may interact with and touch. In either regard, the customer are preferably able to purchase the products provided around a 2D/3D image display.

In one or more embodiments, the respective "states" of shelves are monitored, substantially as described and shown in co-pending and co-owned PCT Patent Application PCT/CA2011/000412 (WO2011/127577), entitled INTERACTIVE VIDEO SHELVING SYSTEM and filed Apr. 13, 2010 (the entire contents of which are incorporated by reference herein). One or more respective shelves, or portions thereof, may be monitored by a content sensor that may be associated therewith. A 2D/3D image display screen and one or more content sensors may be interconnected with one or more computing devices and are operable to monitor the content of a shelf, cavity and/or compartment, and thereby the state thereof, and present one or more images in dependence on the state thereof.

In an embodiment, a mirror may be provided with virtual shopping display and may include an oval structure having a glass border and also a series of stainless steel rings making up the border. Although many of the examples and descriptions provided herein of the virtual shopping display relate to round or oval shaped displays, other geometric shapes are supported including, for example, rectangular, triangular, diamond or other shaped displays. The mirror may also be positioned on top of a glass shelf. Furthermore, the 2D/3D image provided on an 2D/3D image display may be broadcasted or provided on a monitor screen with video, or it may be some type of projection screen where video may be projected onto. In an embodiment, the hardware for having a LCD monitor broadcast the 2D/3D image may be available. Storage, such as for wires and a battery station for an LCD monitor, are positioned behind the LCD monitor. Although many of the examples and descriptions provided herein relate to liquid crystal display ("LCD") monitors, one skilled in the art will recognize that any suitable display type is supported including, for example, light emitting diode ("LED"), plasma, rear projection or other suitable display technology. Moreover, the present application supports any suitable interactive computing device including, for example, personal digital assistants, smartphones, tablet computers or the like.

In an embodiment, the projected or displayed images onto a virtual shopping display may be static or moving images, or a combination of both static and/or moving images. The projected or displayed video(s) and/or animations may be of any type that can be readily displayed or viewed on a standard display screen. The projected or displayed video content may be re-rendered before being displayed on a virtual shopping display.

In another embodiment, the projected or displayed content may be hyper-realistically rendered 2D/3D objects of tangible gift items so as to present the user with a very realistic 2D/3D shopping experience. The hyper-realistic 2D/3D objects are not mere photographs: they are actual rendered objects that can be rotated and viewed from all angles, as if the real gift item (e.g., teapot, dining set) were in front of the user. The hyper-realistic 2D/3D objects may be rendered in sophisticated graphics design software such as, for example, AUTODESK'S 2D/3DS MAX, 2D/3D STUDIO MAX, or any suitable advanced graphics design software used to render hyper-realistic 2D/3D objects. This content may be provided in a server off-site so that when loaded or displayed, there need not be excessive load times or the requirements to download excessively large plug-ins or other associated files for the rendered objects to display or the graphics design software to run.

The present application further supports dynamically rendered content as information is received from one or more sources. For example, a plurality of facial gestures, including lips, eyes, eyebrows or the like, as well as hand and arm gestures may be stored in a database and useable for rendering video content representing a person. As particular dialogue is received or otherwise obtained, a rendering of the person is made dynamically and substantially in real time to provide a realistic representation, such as a person speaking to a viewer.

A virtual shopping display in accordance with the present application may also provide optional touch interaction and sensor feedback using video touch technology or other technologies such as, for example, infrared, ultrasonic, active or inactive RFID (Radio Frequency Identification), barcode or the like. In an embodiment, a virtual shopping display in accordance with the present application may be oriented flat like the surface of a normal table, or may be attached to a wall or ceiling, propped up vertically up against a wall, or arranged diagonally, or propped up vertically on a glass structure, or placed within a larger glass tower, or in any direction where images and/or video may be projected upon it, and where users may view the projected content.

In another embodiment, the virtual shopping display in accordance with the present application may be able to transmit and receive relevant display information to and from a mobile cellular phone, PDA (e.g., Blackberry), smart phone (e.g., HTC device, iPhone) or other mobile computing device in order to display the image content upon the smaller screen of the applicable mobile device.

The image and/or video content that may be displayed on a virtual shopping display in accordance with one or more embodiments, (such as by projection or on the flat surface screen of virtual shopping display) may be provided in associated software. Furthermore, software may be utilized to manage the projection and/or display of the image and video content and the operation of various components used with virtual a shopping display, or on a virtual shopping display itself.

Referring now to the drawings, in which like reference numerals refer to like elements, FIG. 1 shows an example hardware arrangement associated with an embodiment of the present application. In the example shown in FIG. 1, server 102 is connected to at least one terminal through a network, wherein server 102 stores software according to an embodiment. Software or program code directed to functions and data structures which can be used in, for example, an interactive virtual marketing environment, and useful for engaging customers, and may be tied to remote server 102. Server 102 is preferably connected to connection network 104, which may be the Internet, which is in turn may be connected to at least one computer 108 by a direct connection, to at least one mobile computer 106 via a wireless connection or a direct connection, and to at least one cellular phone or mobile device 110, the cellular phones and mobile devices being configured to receive streaming video, internet-based content or Wireless Application Protocol (WAP) based content. The at least one cellular phone and mobile device 110 may include, for example, cell phones, smart phones, PDAs, blackberries, iPhones, or the like.

Figure 2:
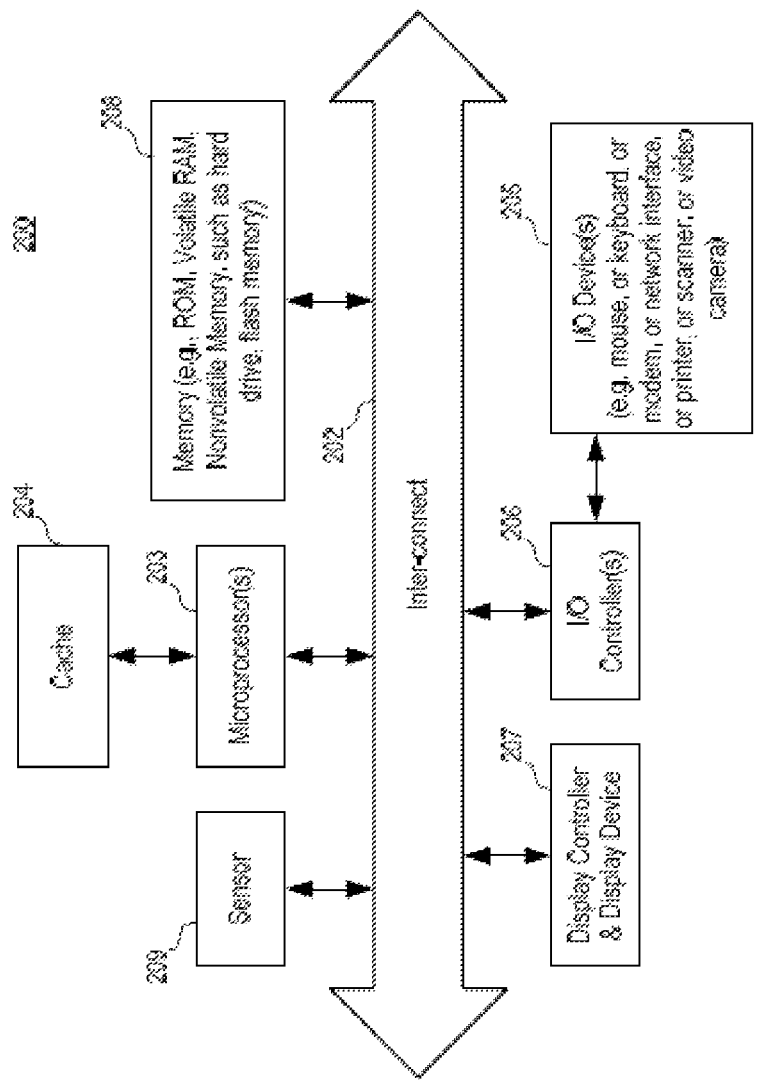
FIG. 2 illustrates functional elements, of which one or more may be configured in a computing device, in accordance with an embodiment.

FIG. 2 illustrates an example arrangement of components in a device in connection with the present application. The various components illustrated in FIG. 2 include those of a computer system, although it is not intended to represent any particular architecture or manner of interconnecting the components. Some embodiments may use other systems that have fewer or more components than those shown in FIG. 2. Data processing system 200 may include interconnect 202 (e.g., bus and system core logic), which interconnects a microprocessor(s) 203 and memory 208. Microprocessor 203 is coupled to cache memory 204. Inter-connect 202 interconnects the microprocessor(s) 203 and memory 208 together and also interconnects to a display controller, display device 207, sensor 209 and peripheral devices such as input/output (I/O) devices 205 through an input/output controller(s) 206. Sensor 209 may include, for example, an accelerometer to determine the orientation of the user terminal and/or to detect the shaking of the user terminal, or hand motions near the user terminal, or as another example, audio recording equipment to record sound near the user terminal.

Typical I/O devices include mice, keyboards, modems, network interfaces, printers, scanners, video cameras, touch pads, microphones and other devices which are well known in the art. In some embodiments, when the data processing system is a server system, some of the I/O devices, such as printer, scanner, mice, and/or keyboards, are optional. Interconnect 202 may include one or more buses connected to one another through various bridges, controllers and/or adapters. In an embodiment I/O controller 206 includes a USB (Universal Serial Bus) adapter for controlling USB peripherals, and/or an IEEE 1394 bus adapter for controlling IEEE-1394 peripherals. Memory 208 may include ROM (Read Only Memory), volatile RAM (Random Access Memory), and non-volatile memory, such as hard drive, flash memory, or the like.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects. In general, a machine readable medium includes any mechanism that provides (i.e., stores and/or transmits) information in a form accessible by a machine (e.g., a computer, network device, personal digital assistant, manufacturing tool, a device with a set of one or more processors, or the like).

A machine readable medium also can be used to store software and data which when executed by a data processing system causes the system to perform various methods. The executable software and data may be stored in various places including for example ROM, volatile RAM, non-volatile memory and/or cache. Portions of this software and/or data may be stored in anyone of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Portions of the data and instructions can also be obtained dynamically, just in time, when needed for execution. Thus, it is not required that the data and instructions be on a machine readable medium in entirety at a particular instance of time.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to the data processing system through a network interface such as a modem or Ethernet interface, can also be used.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), among others.

The computer-readable media may store the instructions. In general, a tangible machine readable medium includes any mechanism that provides (i.e., stores and/or transmits) information in a form accessible by a machine (e.g., a computer, network device, personal digital assistant, manufacturing tool, or any device with a set of one or more processors).

Figure 3:
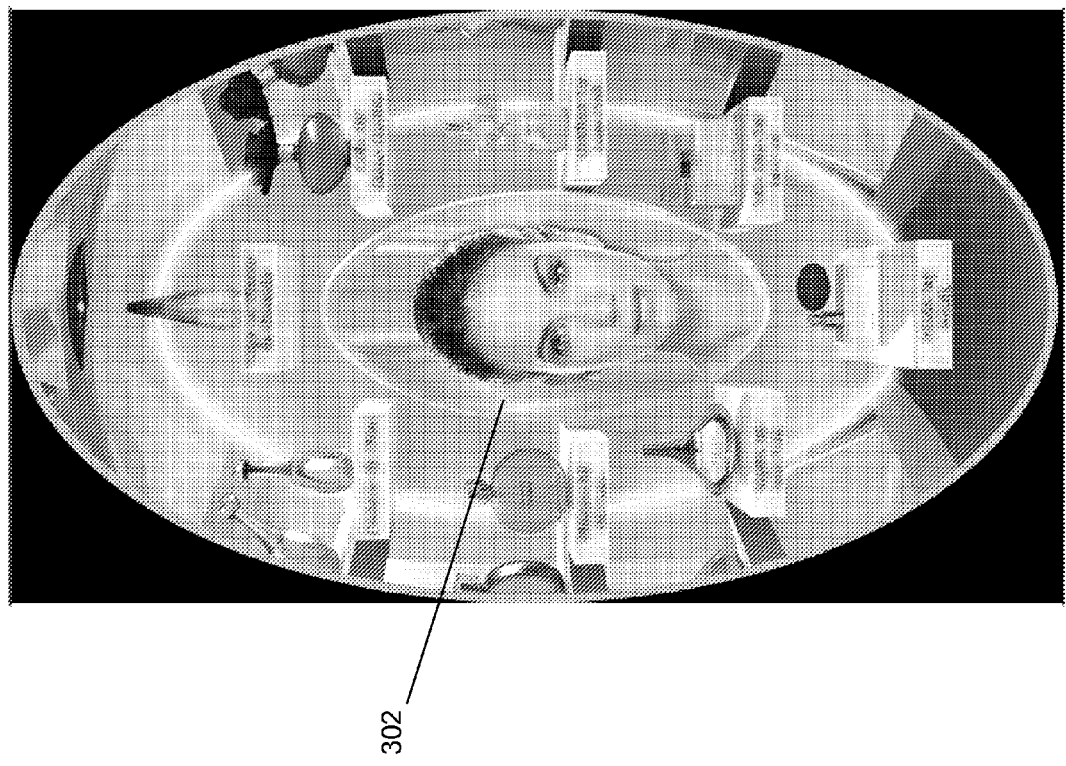
FIG. 3 illustrates an embodiment of a virtual shopping display that includes one or more products that are arranged at or around an image display.
Figure 3:

FIG. 3 illustrates an embodiment of a virtual shopping display 300 that includes one or more products that are arranged at or around 2D/3D image display 302. A plurality of products may be arranged below and/or to the sides of 2D/3D image display 302. Alternatively or in addition, a plurality of products may be arranged in a circular fashion bordering around 2D/3D image display 302. In yet another embodiment, there may be one product or a single line of products being offered for sale at or near 2D/3D image display 302. In addition to physical products (such as vials of perfume or cologne) that are provided at or near 2D/3D image display 302, virtual representations (such as 2D/3D images) of one or more products may be provided in lieu of (or in addition to) products being offered sale. In such embodiment(s), software that is suitable for providing 2D/3D rendering is employed and used for providing one or more of the 2D/3D images. Moreover, virtual shopping display 300 may comprise a plurality of 2D/3D image displays 302.

In an embodiment wherein at least one product is physically located at or near 2D/3D image display 302, at least one camera may be provided for optically detecting the product(s) as well as activity associated therewith. In an embodiment, a plurality of cameras are positioned to at or near one or more respective shelves of virtual shopping display 300, for example, for product detection and recognition. Products provided with virtual shopping display 300 may be provided with machine recognizable identification, such as a tag or label, and be detected by at least one of a plurality of cameras that are detected when a product is turned, slid or otherwise moved from a respective position. In an embodiment, active or inactive RFID tags are effective for enabling virtual shopping display 300 to identify with particularity a single product that has been moved and to take action respective to that product. For example, when a product configured with an active or inactive RFID tag is moved, the tag effectively "wakes" and transmits to virtual product display 300 information representing the product and the movement thereof. Additional processing, such as to display information about the respective product, or to inquire whether a customer would like assistance with the respective product, may be provided in response to the transmission. This conveniently reduces or eliminates a need for other processing steps associated with product identification, such as by detecting a machine readable tag or image recognition to determine that a respective product has been moved and the identification thereof. A plurality of cameras increases a likelihood of detecting when an object, such as a product, has been touched or moved. In an embodiment, two cameras are positioned at the beneath a respective shelf of virtual shopping display 300 and are directed toward each other at a given angle, such as 45 degrees, or any other suitable angle. By positioning the cameras substantially at this angle, a virtual depth perception may be provided, for example, as each of the cameras detects an object, such as a customer's hand, moving toward or from a product. In one or more embodiments, object recognition may be provided by laser technology, video technology, recognizing an object's shape, tag, and/or active/inactive RFID.

Moreover, at least one computing device is in communication with the display screen and the at least one camera for presenting sales and promotional information on the display screen based at least on the contents and/or activity sensed thereby, substantially as shown and described in co-pending and co-owned PCT Patent Application PCT/CA2011/000412, as noted herein. As a person moves his/her hand to approach a product on or near virtual shopping display 300, or as a product is moved from a known location therewith, one or more actions may occur or be taken, For example, 2D/3D image display 302 may present become active and interact with the customer, for example, to display information relating to a product or to inquire whether the customer would like some assistance.

FIGS. 4A-4E illustrate example embodiments of virtual shopping display 300 that is configured with mirror 402 in any shape (e.g., circular, oval, rectangular, or the like) and arranged above a cylindrical portion 404. The mirror may be colored or may be clear. In an embodiment, the cylindrical portion is made of glass or similar material and one or more products are arranged therewith. Below the cylindrical portion may be a supporting apparatus, which may include one or more rods 406 and a base 407.

In the embodiment illustrated in FIGS. 4A-4E, virtual shopping display 300 is configured with a large cylinder supporting structure that includes a circular base, and another a similar cylindrical structure may be positioned and above the circular base. The products to be advertised in tandem with 2D/3D image display 302 may be arranged, for example, either on the circular base structure or within or on top of the actual cylindrical structure. Projections of the products may also be placed near cylindrical portion 404.

Figure 4A:
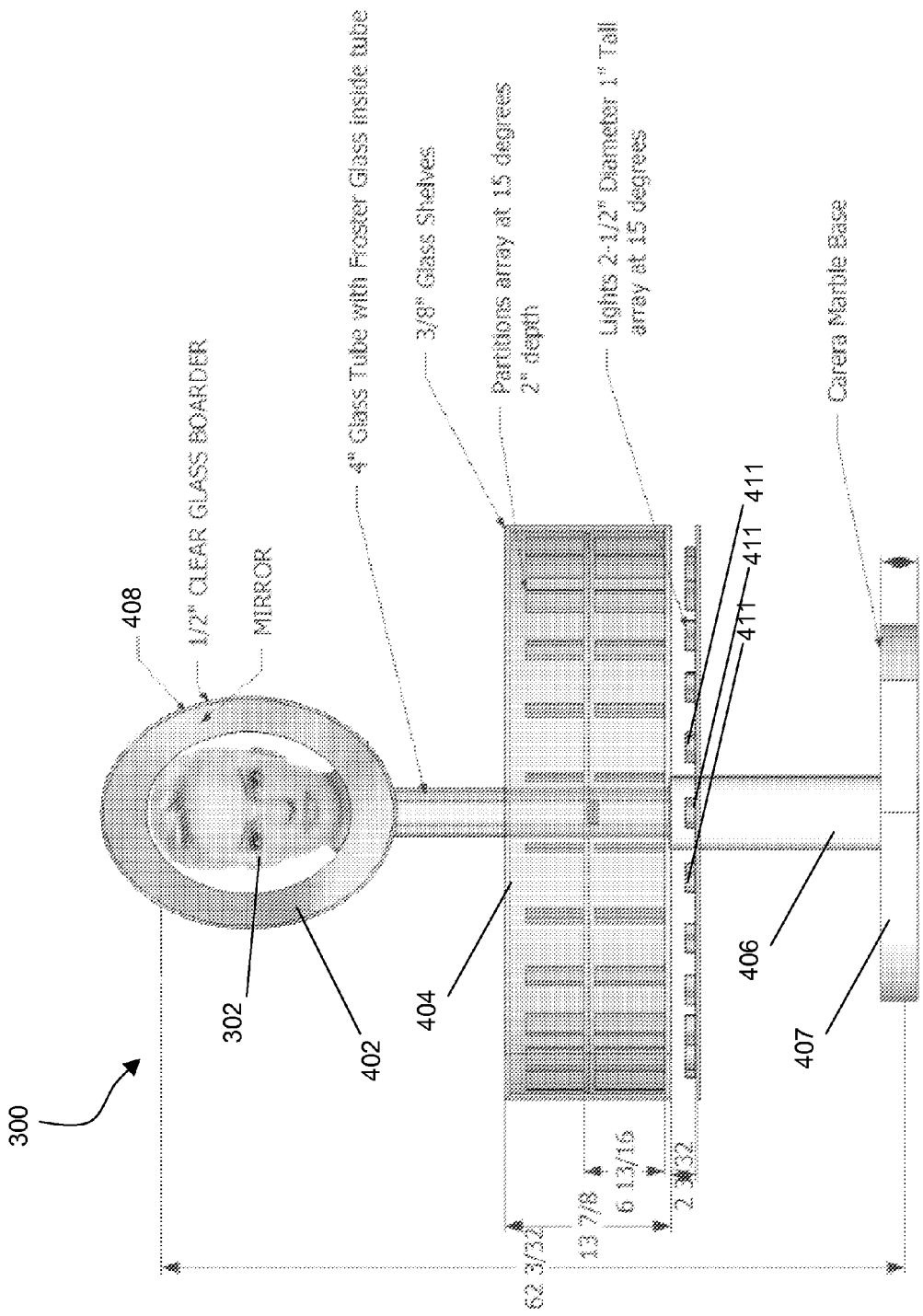
Figure 4B:
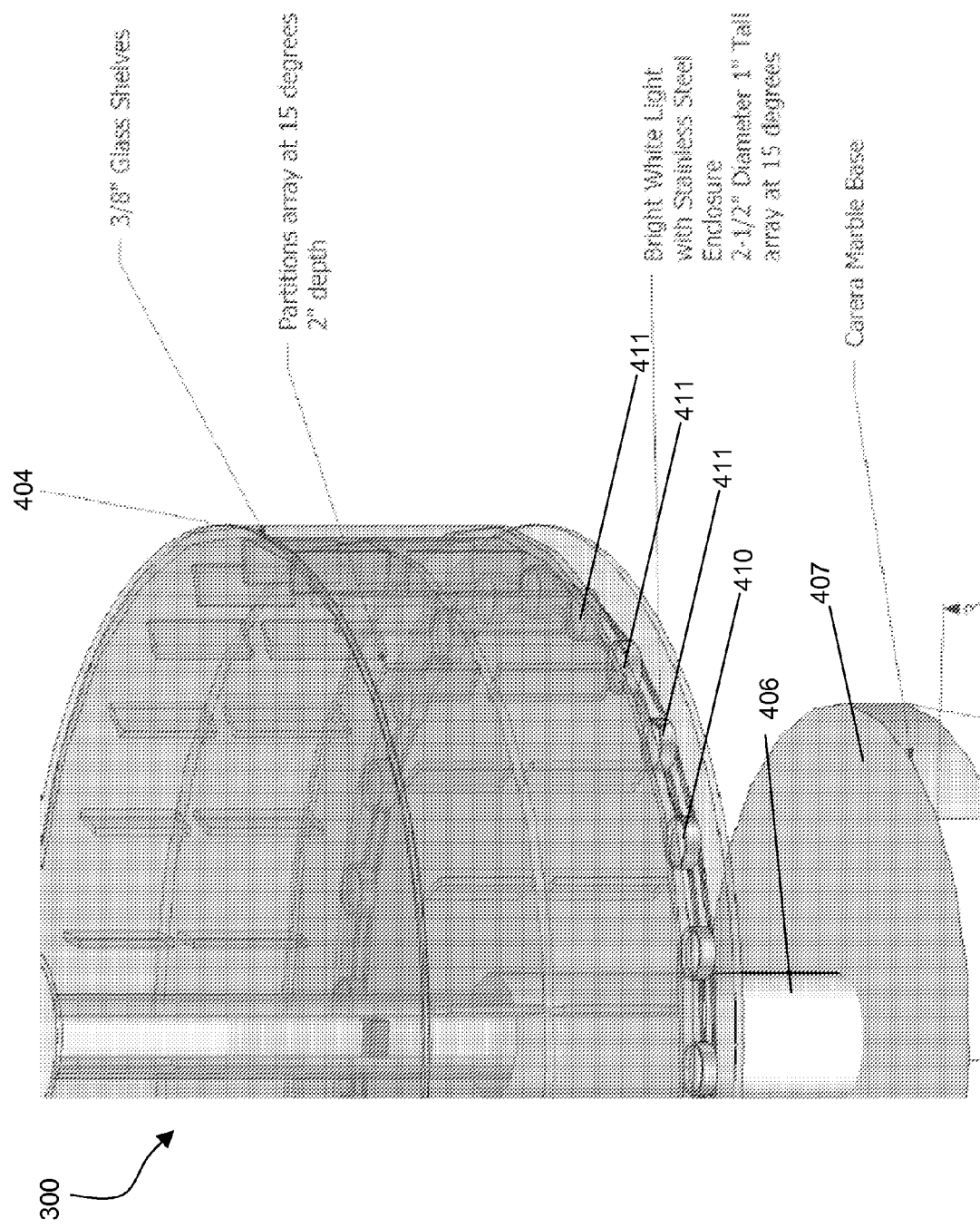
Figure 4D:
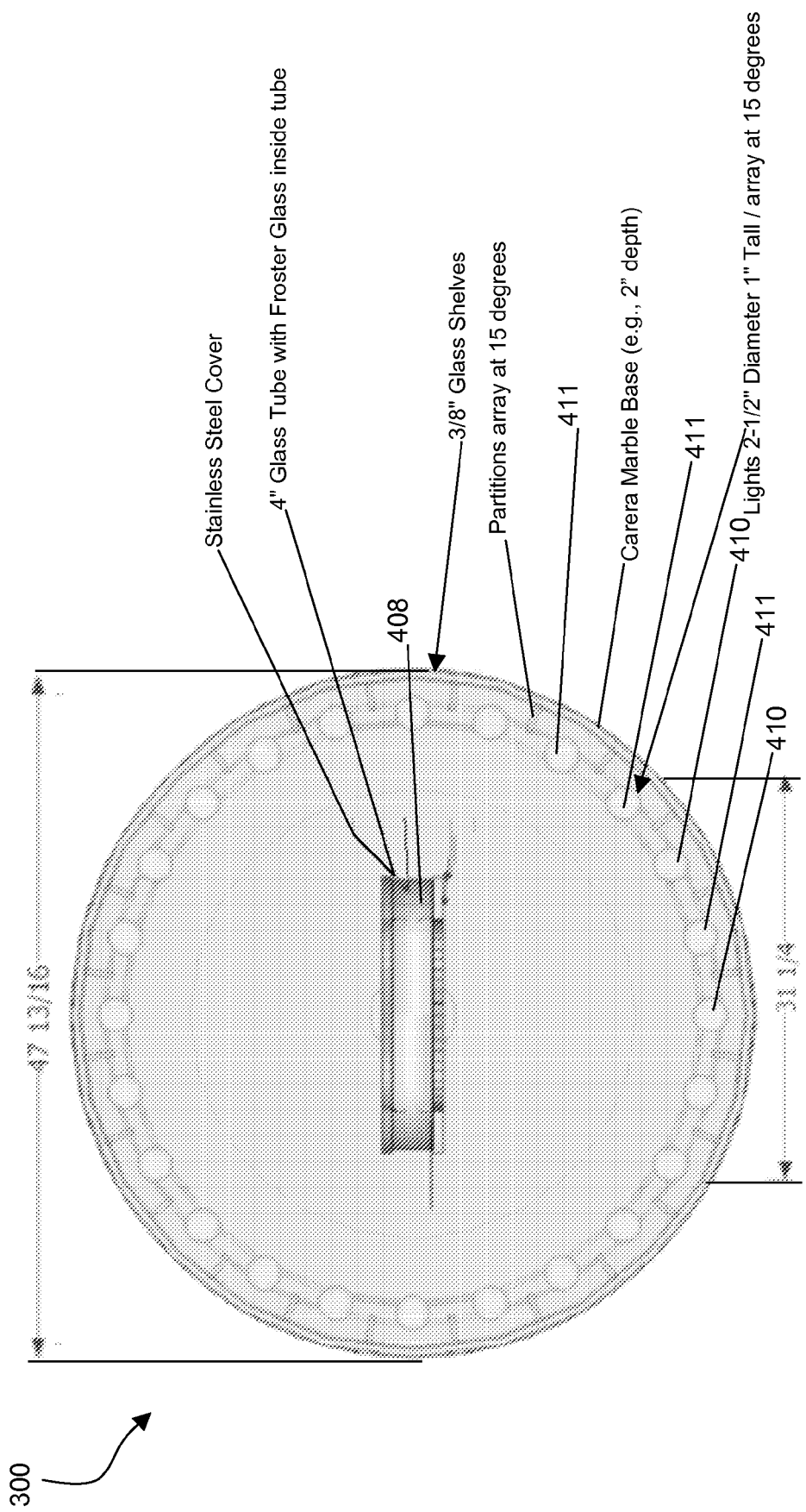
Figure 4E:
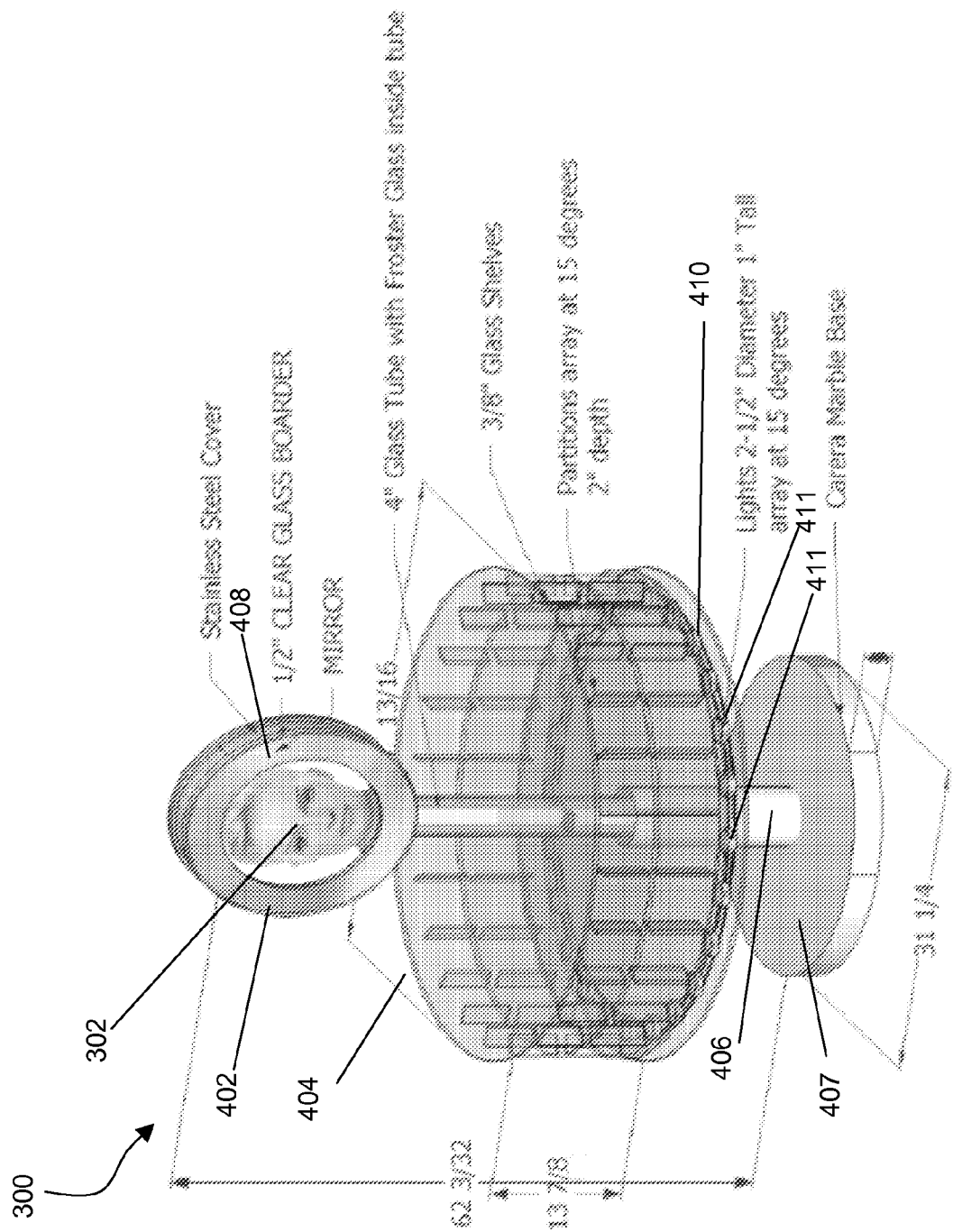

Continuing with reference to the example embodiment shown in FIGS. 4A-4E, virtual shopping display 300 comprises a clear glass border and/or a stainless steel cover 408. 2D/3D display 302 may be arranged at or near the top of a pole or other cylindrical supporting structure such as a thin glass tube with frosted glass inside the tube (see, for example, FIG. 4A). Around the thin cylindrical supporting structure may be wide cylindrical structure 404. Wide cylindrical structure 404 may, for example, contain small glass shelves or small partitions, arranged in an array, for example, of 15 degrees at a depth of 2 inches, and may be useable for displaying products.

Although the example illustrated in FIGS. 4A-4E and references herein relate to "thin" cylindrical or "wide" cylindrical structures, other relative sizes or shapes are supported by the present application. For example, one or more pyramidal structures or square-shaped structure(s), or combinations thereof, may be provided with virtual shopping display 300.

Continuing with reference to FIGS. 4A-4E, lights 410 may further be arranged at the bottom of the wide cylindrical structure. In addition or in the alternative to lights 410, one or more cameras 41 may be arranged at or near the bottom of wide cylindrical structure 404 for, for example, monitoring one or more products provided therewith or for detecting movement, such as of a customer approaching a shelf or product provided with virtual shopping display 300.

In accordance with one or more embodiments of the present application, a customer transaction is supported via virtual shopping display 300 in efficient, convenient and highly accurate ways. For example, a customer query may be received via input device(s) provided with virtual display 300. Thereafter, the query may be transmitted to one or more parties operating computing devices for responding to the customer. In an embodiment, a plurality of operators provide replies to customer queries to cross-reference and/or ensure accuracy of replies to the queries.

In an embodiment, a database of prepared replies is provided and respective replies to queries are provided to one or more operators who submit at least portions of the query, such as keywords thereof. As the operator(s) enter keywords associated with a query, sample queries and/or responses may appear automatically and may be selectable for fast and accurate access. For example, an operator, in response to a customer asking for information about CHANEL #44 may type the letters C H A . . . , and sample queries, answers and/or keywords may appear for the operator to select a response. As the information representing a query (or question) that is submitted increases, such as by the operator(s) adding one or more words or letters at a time, the higher the likelihood is of obtaining an accurate match. Once selected, the appropriate reply is preferably transmitted to virtual shopping display 300 and presented to the customer, substantially as described herein.

Continuing with reference to FIGS. 4A-4E, at the bottom of wide cylindrical structure 404 may be a larger circular or oval base 407 made out of a strong material, such as marble (e.g., a carera marble base or a base made out of marble or other suitable material). The products being advertised in tandem with 2D/3D image display 302 may be placed within the shelves of the wider cylindrical structure 404 or may be placed above on top of the wider cylindrical structure or to the sides of the wider cylindrical structure. In an embodiment, lights 410 at the bottom of the wide cylindrical structure 404 may be arranged at an array of 15 degrees for each light to create an overall circular lighting for the entire wide cylindrical structure. In an embodiment, lights 410 may be bright white lights or LEDs each having stainless steel enclosures.

Figure 4F:
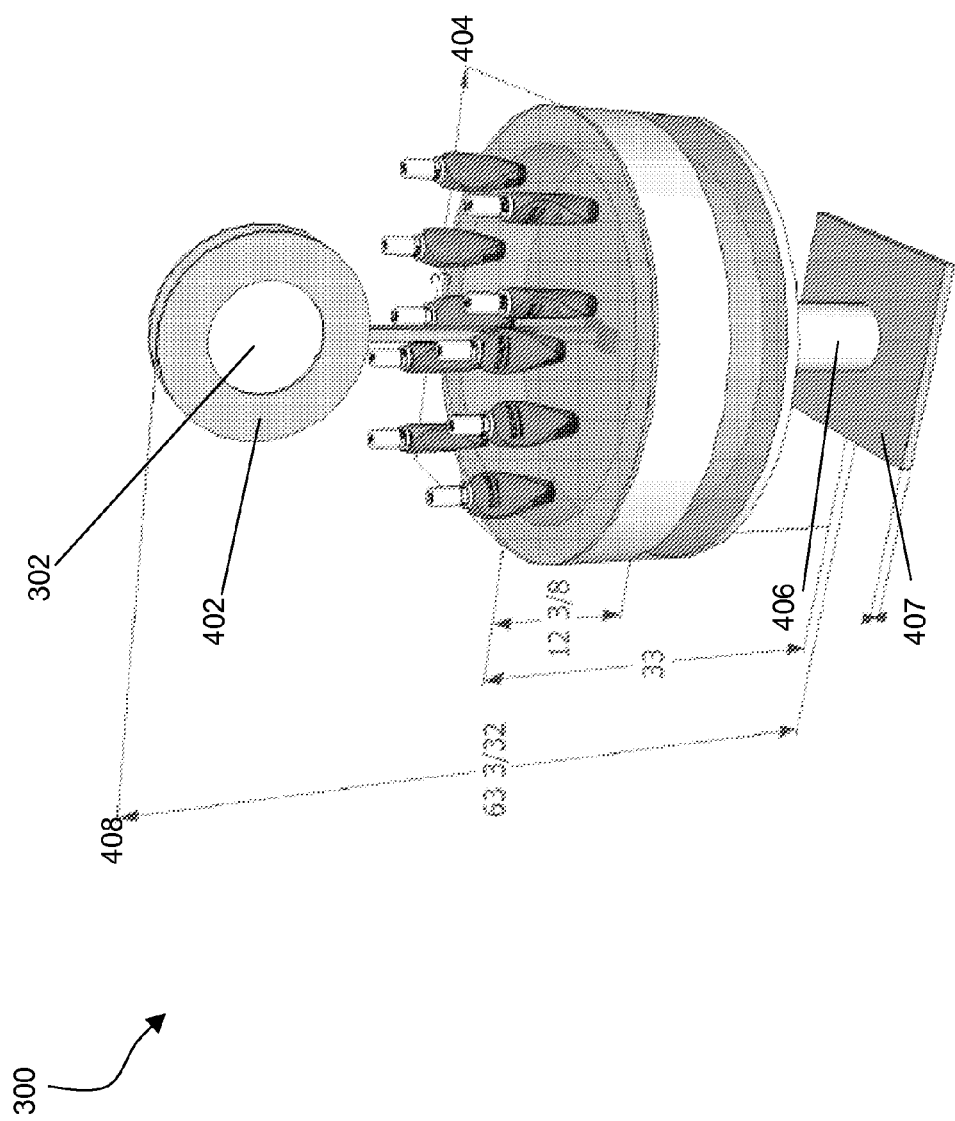

FIG. 4F illustrates an alternative example embodiment of virtual shopping display 300 that includes square base 407, and virtual representations of products, such as shown and described more fully in co-owned and co-pending U.S. patent application Ser. No. 13/073,894, entitled SYSTEMS AND METHODS FOR MAKING AND USING INTERACTIVE DISPLAY TABLE FOR FACILITATING REGISTRIES, filed Mar. 28, 2011 (the entire contents of which are incorporated by reference herein).

Figure 5:
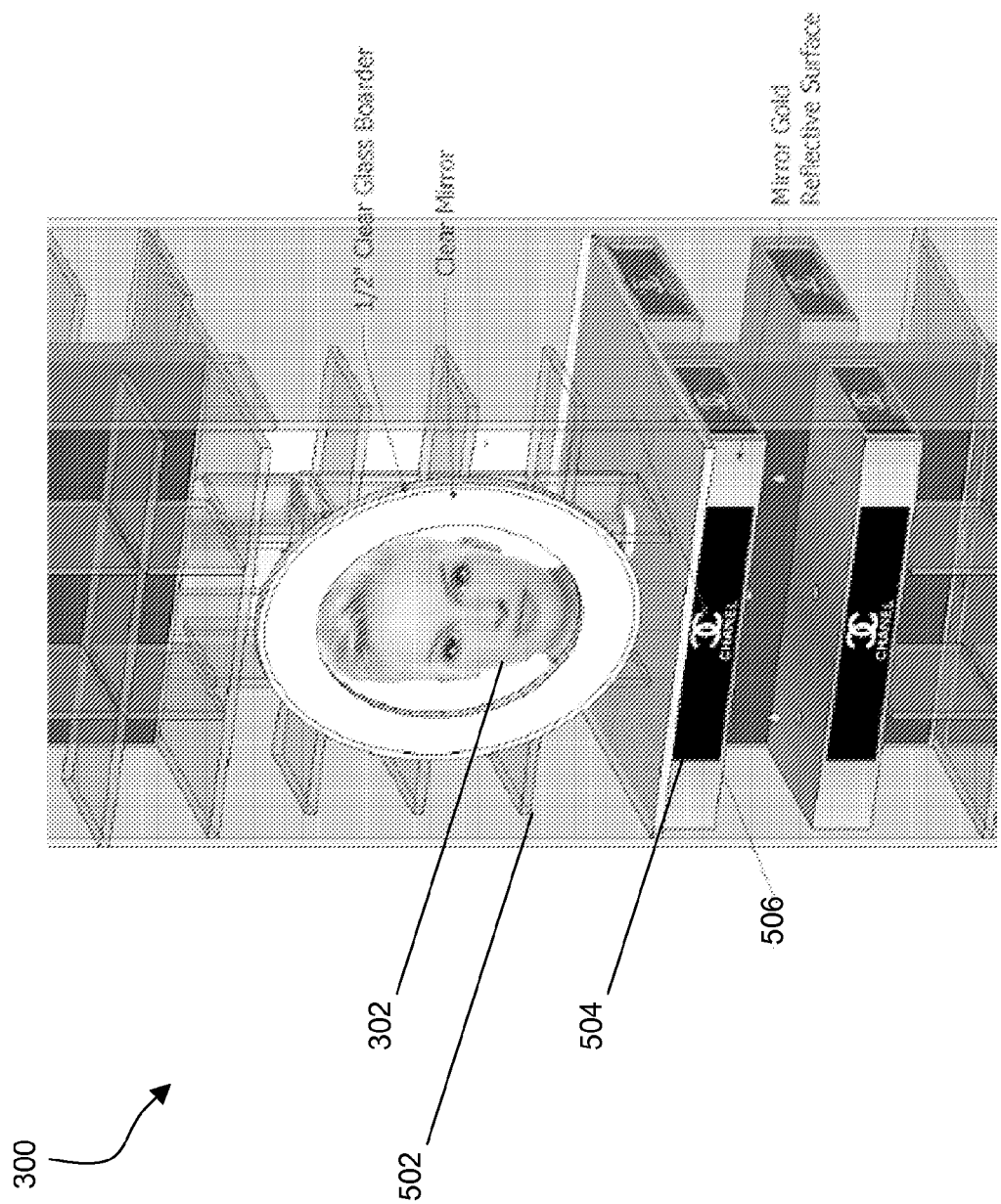
FIG. 5 illustrates an example virtual shopping display that includes a tower portion for at least product display.

FIG. 5 illustrates an example virtual shopping display 300 that includes tower 502, which may be made of glass or a similar material. Tower 502 may further include a thin clear glass or glass-like border, and/or may include a background made of a clear mirror material or similar material. Further, glass tower 502 may be coupled to 2D/3D image display 302 and may be transparent and comprised of a plurality of interlocking frames or prisms to create a modern-looking aesthetically pleasing effect. In an embodiment, logos 504 of one or more products being sold (for instance, a logo of a famous perfume company) may be displayed prominently. In an embodiment, logos 504 may be backlit, and/or may be placed on a colored (e.g., golden) material having a reflective surface. Further, and in the embodiment illustrated in FIG. 5, the display rectangle or case may display one or more logo banners, for example on the side and/or front surfaces of the display rectangle boxes. In an embodiment, the display rectangle may have one or more cavities 506, for example, at the middle of the top and bottom surfaces to enable products to be placed within and to be advertised.

Figure 6A:
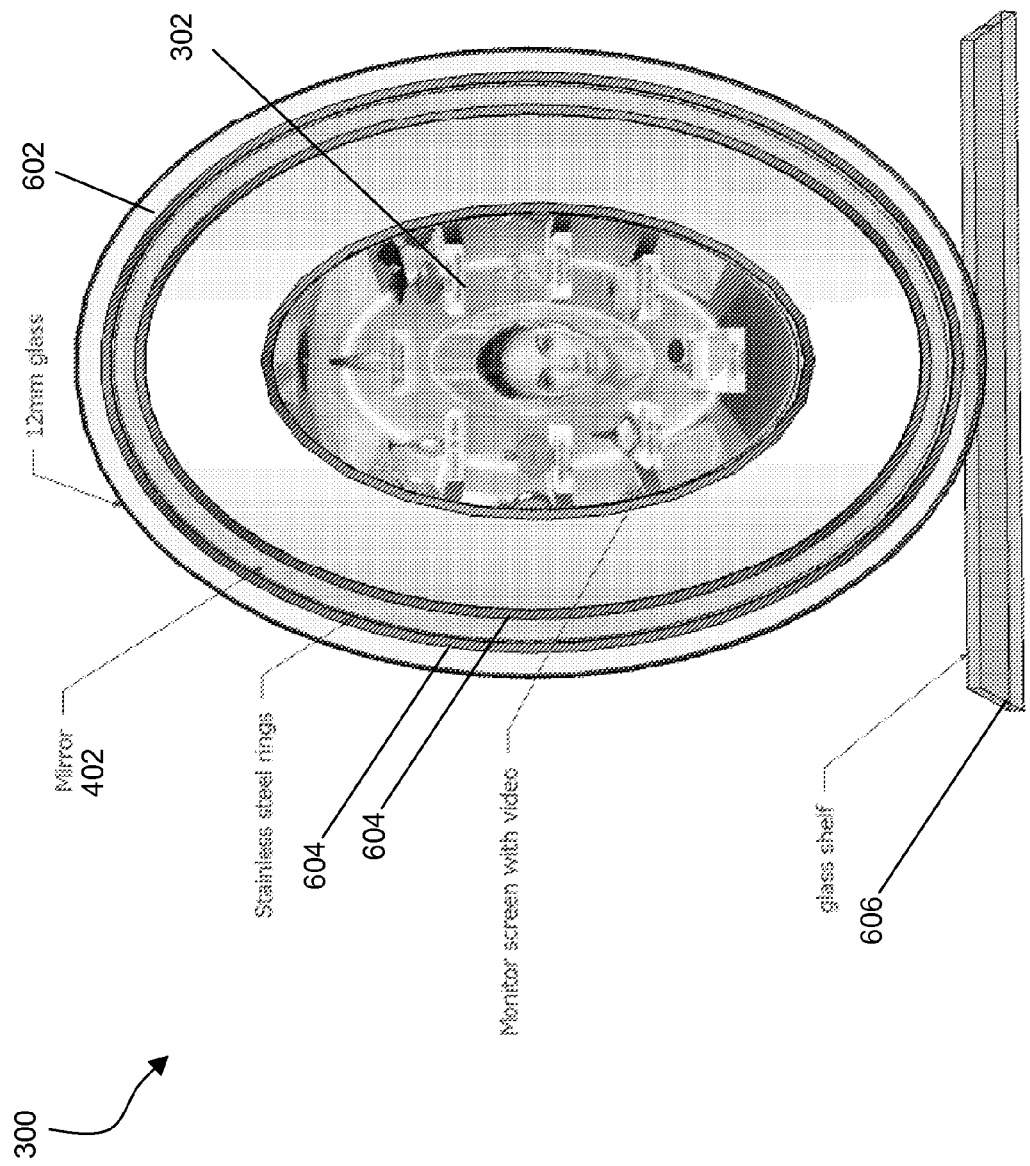

FIGS. 6A and 6B illustrate an alternative embodiment of virtual product display 300. In the embodiment shown in FIG. 6, mirror 402 attached to virtual shopping display 300 may include a plurality of more layers. One layer, for example, may include a 2D/3D image display 302 and contains mirror 402. Also shown in FIG. 6A, glass border 602 runs around the edges of mirror 402. Another layer 604, beneath the first surface layer, may be hollow or configured to be made of glass or other similar material. This second layer may, in addition or in the alternative, be configured with a stainless steel cover 408. A third layer (not shown) may be also provided at the back of the mirror structure, and may also be configured of glass or also be covered with stainless steel cover 408. A plurality of layers provides an aesthetically pleasing and effective display. Also illustrated in FIGS. 6A and 6B is glass shelf 606. A plurality of materials may be used in accordance with virtual shopping display 300, including, for example, glass, plastic, wood, concrete or other suitable material.

Figure 7:
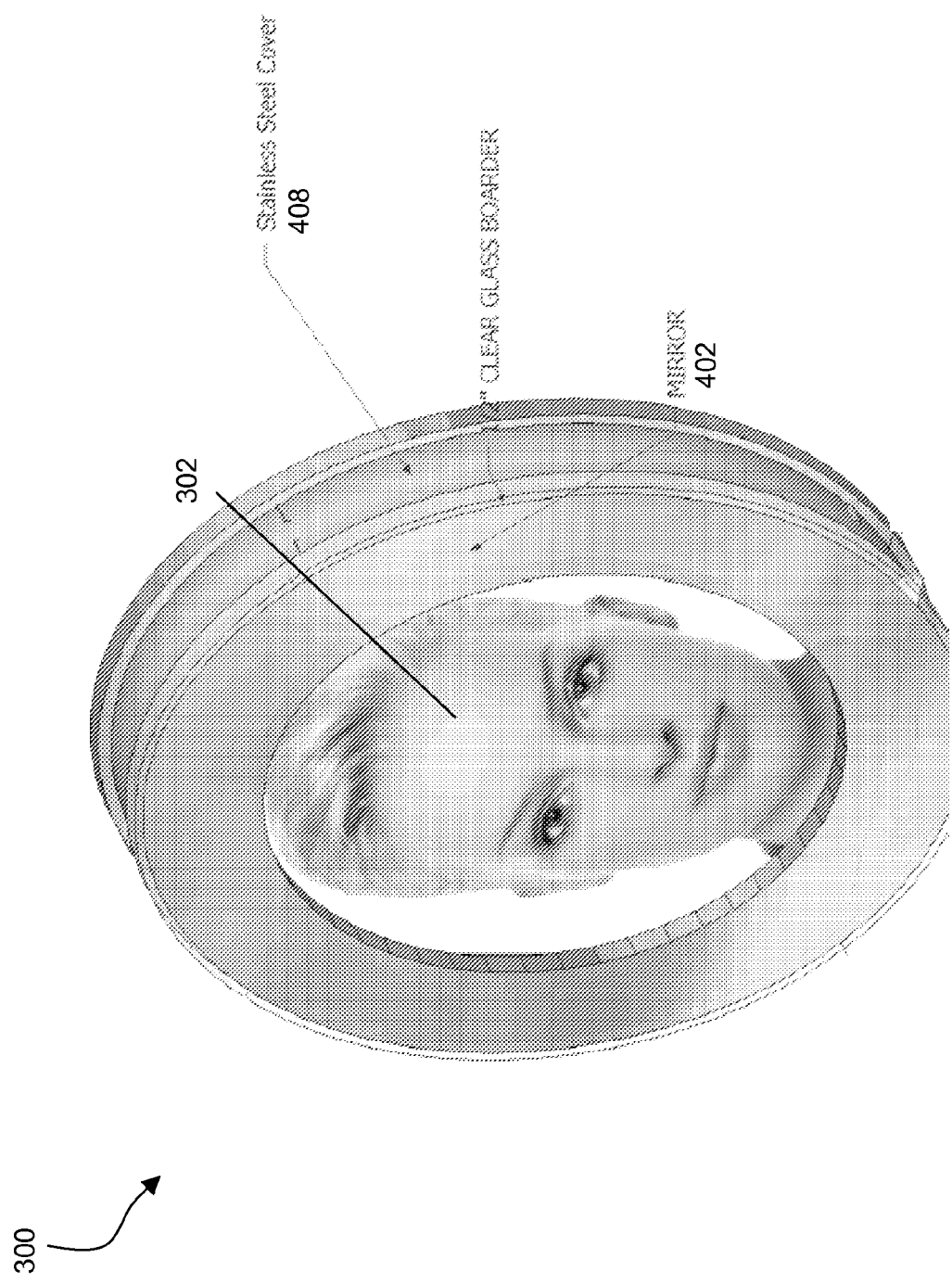
FIG. 7 illustrates a portion of an example embodiment of virtual shopping display in accordance with the present application.

FIG. 7 illustrates at least a portion of an example embodiment of virtual shopping display 300. In the example shown in FIG. 7, cover portion 408 (illustrated as stainless steel cover 408) is provided adjacent to mirror portion 402. 2D/3D image display 302 is illustrated adjacent to mirror portion 402, and a glass border.

Figure 8B:
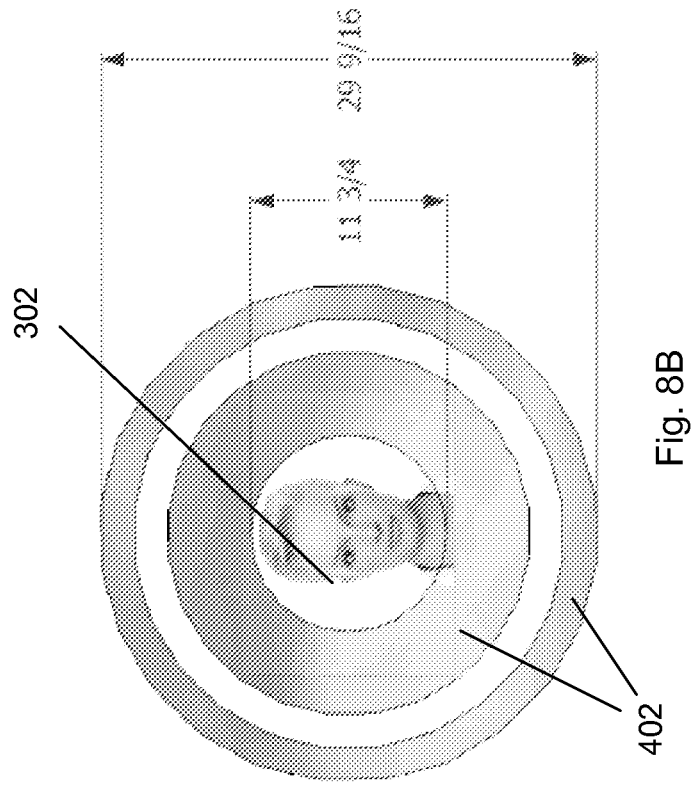
Figure 8A:
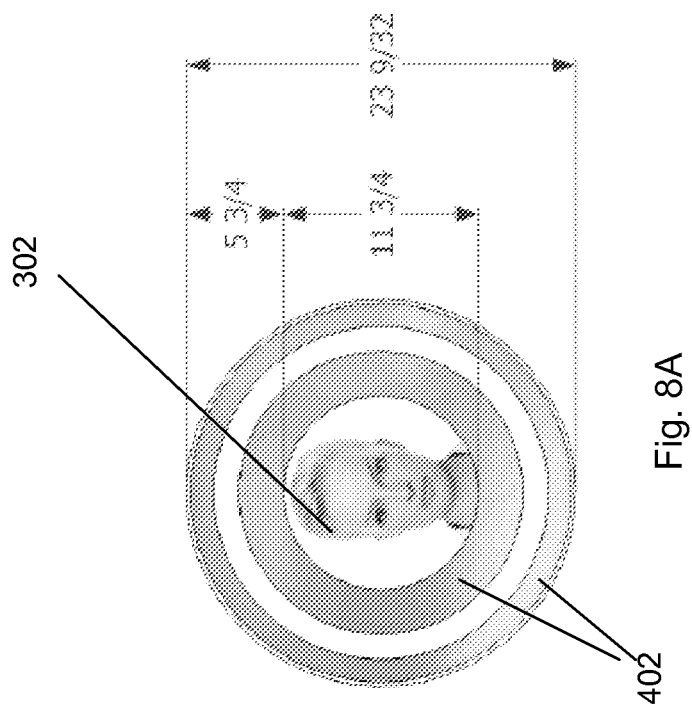
Figure 8D:
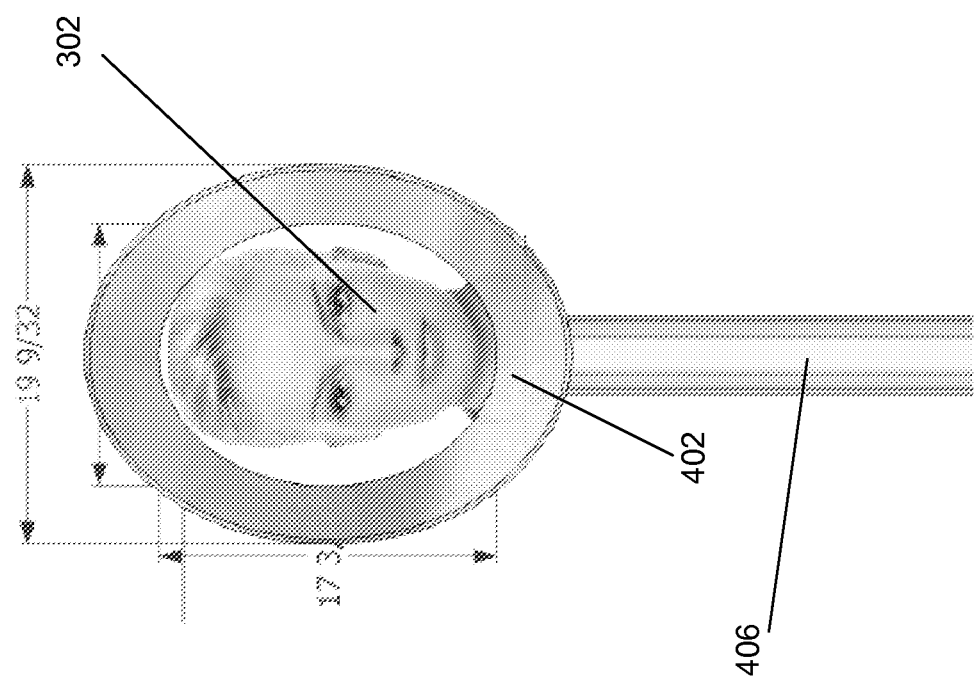
Figure 8E:
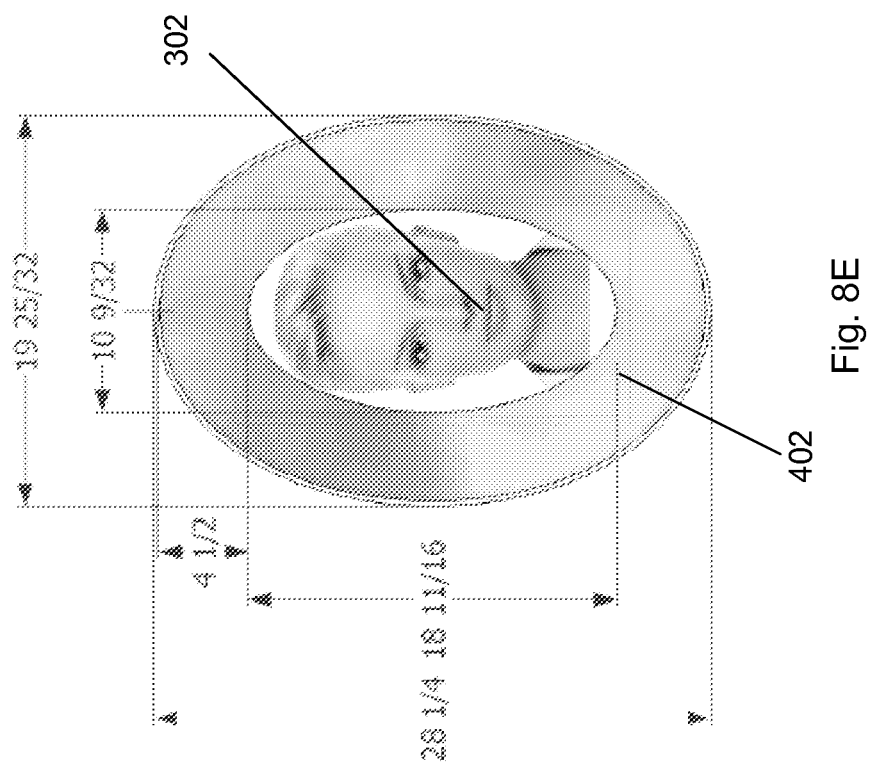

FIGS. 8A-8E illustrate example embodiments of the present application and illustrate one or more mirrors provided in one or more different sizes and lengths that may be configured as rings or borders around 2D/3D image display 302. In one or more embodiments, there may be a larger border around the central 2D/3D image display 302 (FIG. 8A). In another embodiment, there may be less of a border or a smaller space between the outside border and the central 2D/3D image display 302 (FIG. 8B). This may perhaps be a large more circular plate structure where the central 2D/3D image display 302 is arranged in the very middle of the structure. In an embodiment, there may be minimal space between the outside border and the central 2D/3D image display 302 and 2D/3D image display 302 may be arranged to take up substantially the entirety of the surface. Other layouts and example sizes and lengths are illustrated in FIGS. 8C-8E.

Figure 9A:
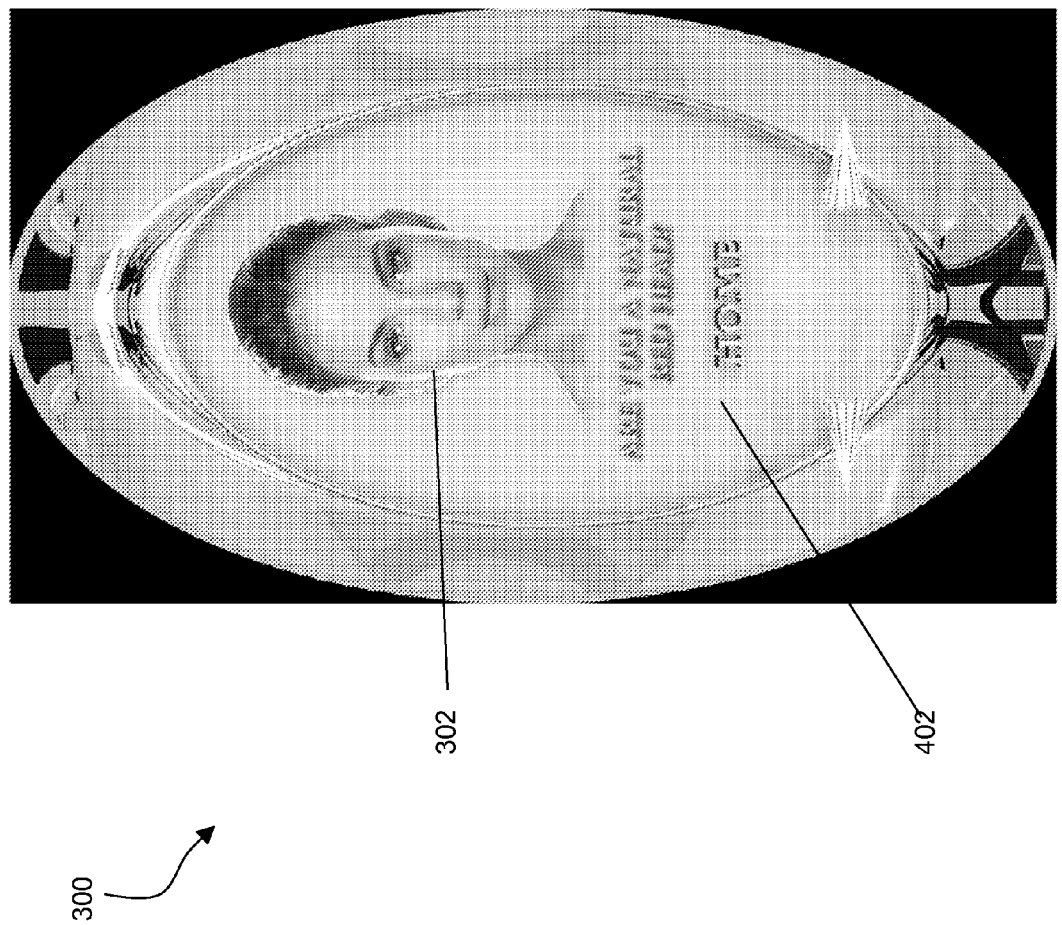
FIGS. 9A and 9B illustrate an example embodiment of virtual shopping display that includes one or more interactive textual displays.
Figure 9B:

FIGS. 9A and 9B illustrate an example embodiment of virtual shopping display 300 that includes one or more interactive textual displays that may be displayed below 2D/3D image display 302, such as on mirror portion 402. For example, one or more questions may be provided to ask a customer if (s)he is a natural blonde, brunette, redhead or if (s)he has black hair. In another example, questions may be provided to ask whether a viewer has eyes that are hazel or green or brown. In an embodiment, the interactive text displays would enable a customer or user to navigate to other selections on an internet website for ecommerce and financial transactions. For example, a user may purchase a product, deposit funds in an account, view other selections, order products, contact customer service or contact a sales representative.

As noted herein, virtual shopping display 300, in accordance with the present application, may also provide optional touch interaction and sensor feedback using video touch technology or other technologies such as, for example, infrared ultrasonic, active or inactive RFID. Virtual shopping display 300 is not limited to touch technologies or touch interaction and can also be entirely video or entirely hyper-realistically 2D/3D content and triggered instead with speech commands, not requiring the user to touch the display at all. Responses to prompts, such as illustrated in FIGS. 9A and 9B can be submitted accordingly.

In an embodiment, a customer is greeted by a virtual full-sized person, substantially as described and shown in co-owned and co-pending U.S. patent application Ser. No. 13/019,974, entitled SYSTEMS AND METHODS FOR HUMAN INTELLIGENCE PERSONAL ASSISTANCE and filed Feb. 2, 2011 (the entire contents of which are incorporated by reference herein). Referred, generally, as a human intelligence personal assistant ("HIPA"), customers may be greeted and provided with information and prompted for replies to queries in connection with any product or service provided for sale. For example, a customer may be asked if he or she is aware of current specials in the various departments at a store, or whether he or she would be interested in further details or assistance with additional information. For example, the HIPA may provide information relating to the location of a specific department, the cost of a particular product whereby the customer provides a verbal description of the item and the HIPA can confirm it by displaying an image of the product. The HIPA may also provide stock availability and details of items that were advertised. In an embodiment, the HIPA has the ability to sell the items directly to the customer using the best sales techniques know to retail that will be pre-scripted by an retail/publicity specialty agency.

In an embodiment, an operator of a computing device that may support a HIPA may have access to information displayed on 2D/3D image display 302. Moreover, the operator may engage in interactivity with a customer. Moreover, and as described in co-owned and co-pending U.S. patent application Ser. No. 13/019,974, a plurality of respective devices are supported, including, for example personal computers, tablets, smartphones, personal digital assistants or the like. The operators may be able, as well to take control of image display 302, and further provide audio content, via synchronous communication therewith.

In addition, a HIPA may provide assistance to a customer for selecting a gift for a friend. The HIPA is preferably well trained on virtually every aspect of a store, and has full access to inventory, product location, supplier product specifications and features of every item in inventory, video images (including 2D/3D renderings of retail items). Moreover, the HIPA is configured with a vast library of pre-scripted exceptional selling points and phrases regarding each item shown with a very targeted method of closing the sale. In this way, the HIPA sales experience is an exceptionally well received.

In other examples, the HIPA may ask a customer if he or she would like assistance to find the location of a specific product(s) or department(s). The HIPA may also ask the customer if he or she would like a copy of a map highlighting specific area(s) of interest and/or any specific advertisement or specific product details and/or a very clean simple 2D/3D map clearly indicating the location of departments or items of interest that are in relation to the customer's current location.

The customer may be asked by the HIPA to provide his or her name and the customer may be asked to pick-up a personalized map highlighting the customer's area of interest and the map may also include featured products in those departments.

Figure 10A:
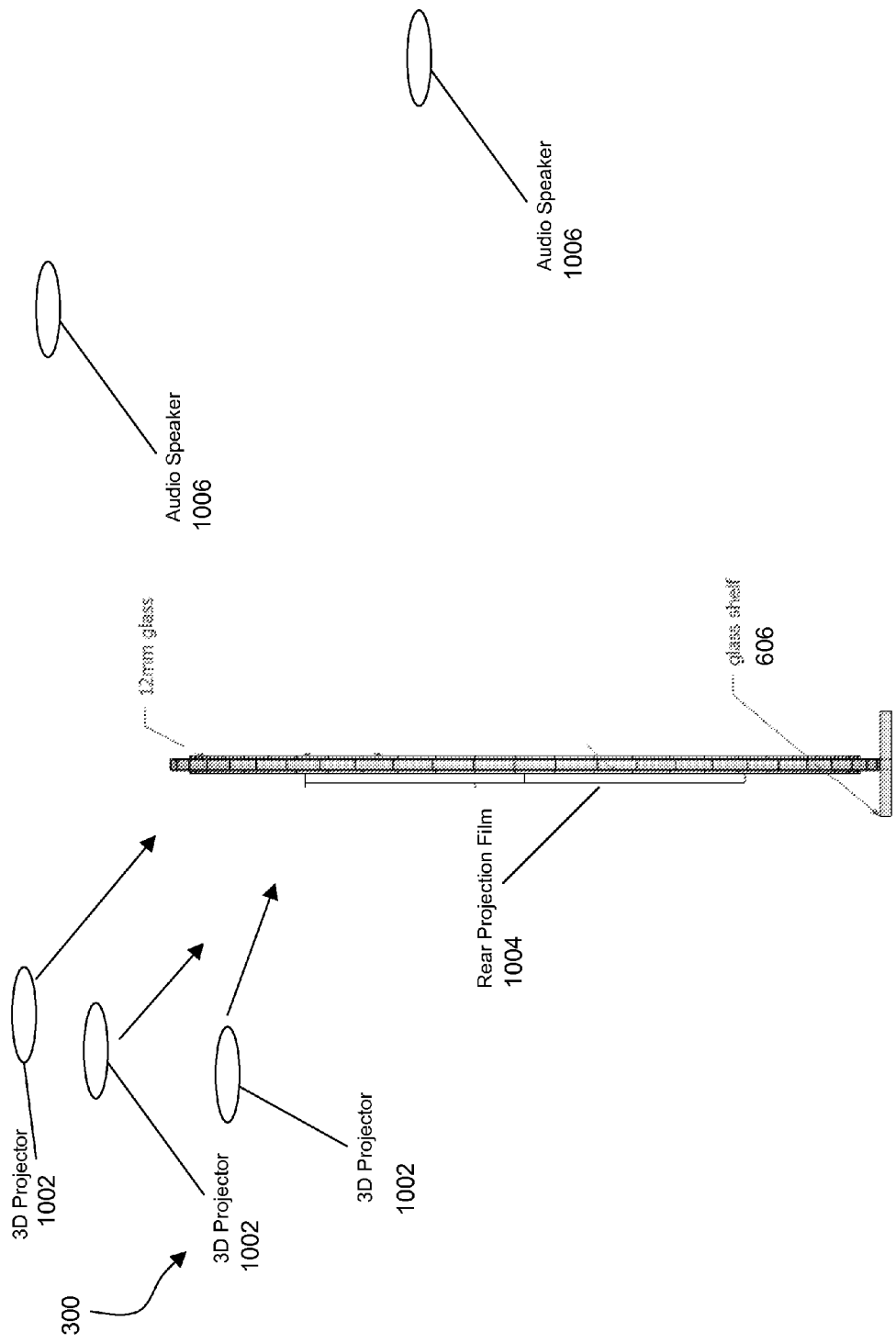
FIG. 10A illustrates an example arrangement for a virtual human intelligence personal assistant that is provided as a two or three-dimensional ("2D/3D") video of a salesperson.

FIG. 10A illustrates an example arrangement for a virtual HIPA that is provided as a highly defined, two or three-dimensional ("2D/3D") video of a salesperson may be recorded and displayed for shoppers. In an embodiment, a plurality of 2D/3D projectors 1002 are strategically positioned, for example in a ceiling and/or on stands, and for projecting onto the projection film, such as the VIKUITI rear projection film 1004, to provide high-resolution, 2D/3D image(s). Directional speakers 1006 may further be provided to play audio content, such as speech. The result is a life-like representation of a salesperson or other person.

Figure 10B:
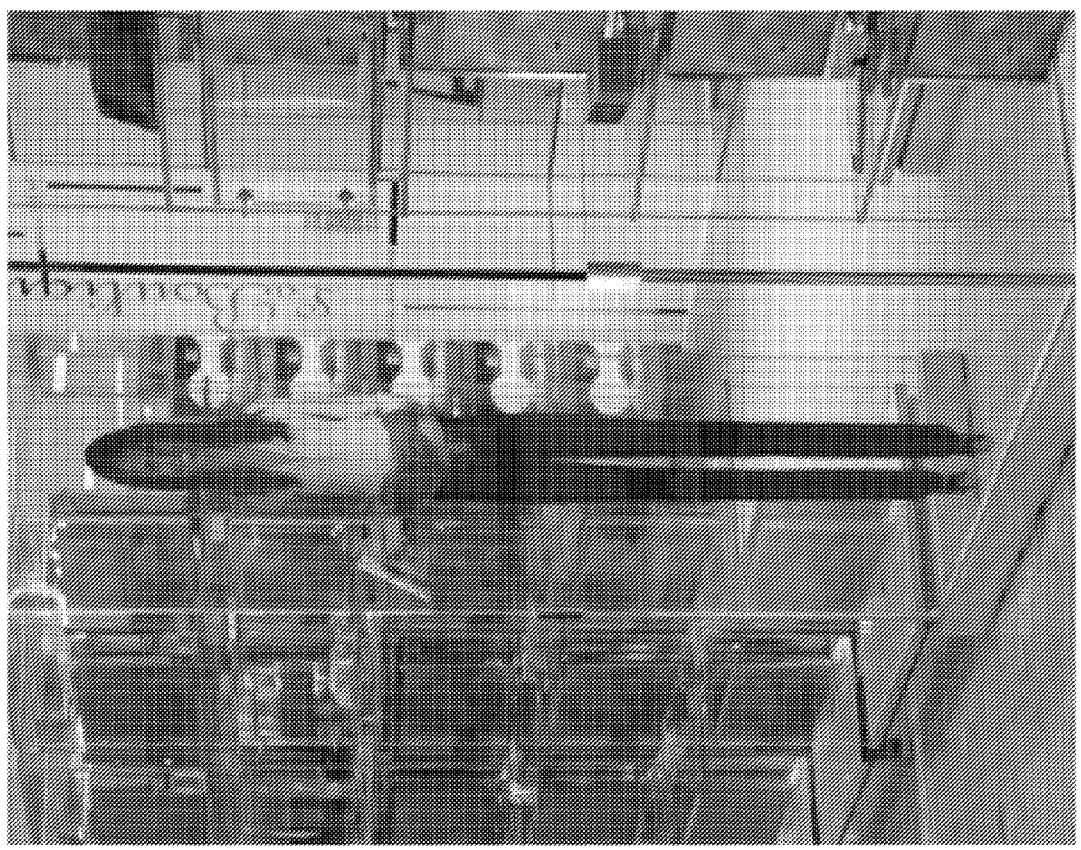
FIG. 10B illustrates an example virtual human intelligence personal assistant, in connection with a virtual shopping display.

In an embodiment, virtual shopping display 300 comprises a flexible, self-adhesive film 1004 that is applied thereto and that receives one or more projected images. The film provides crisp, very sharp images even in areas of high ambient light. Moreover, the film provides excellent display quality from virtually any viewing angle. An example of such film includes VIKUITI rear projection film, or other suitable product. VIKUITI film is believed by the inventor to be particularly effective for use in connection with reflective surfaces, such as mirrors, and provides a suitably wide viewing angle and very sharp color and images, substantially as shown in FIG. 10B.

Figure 11:
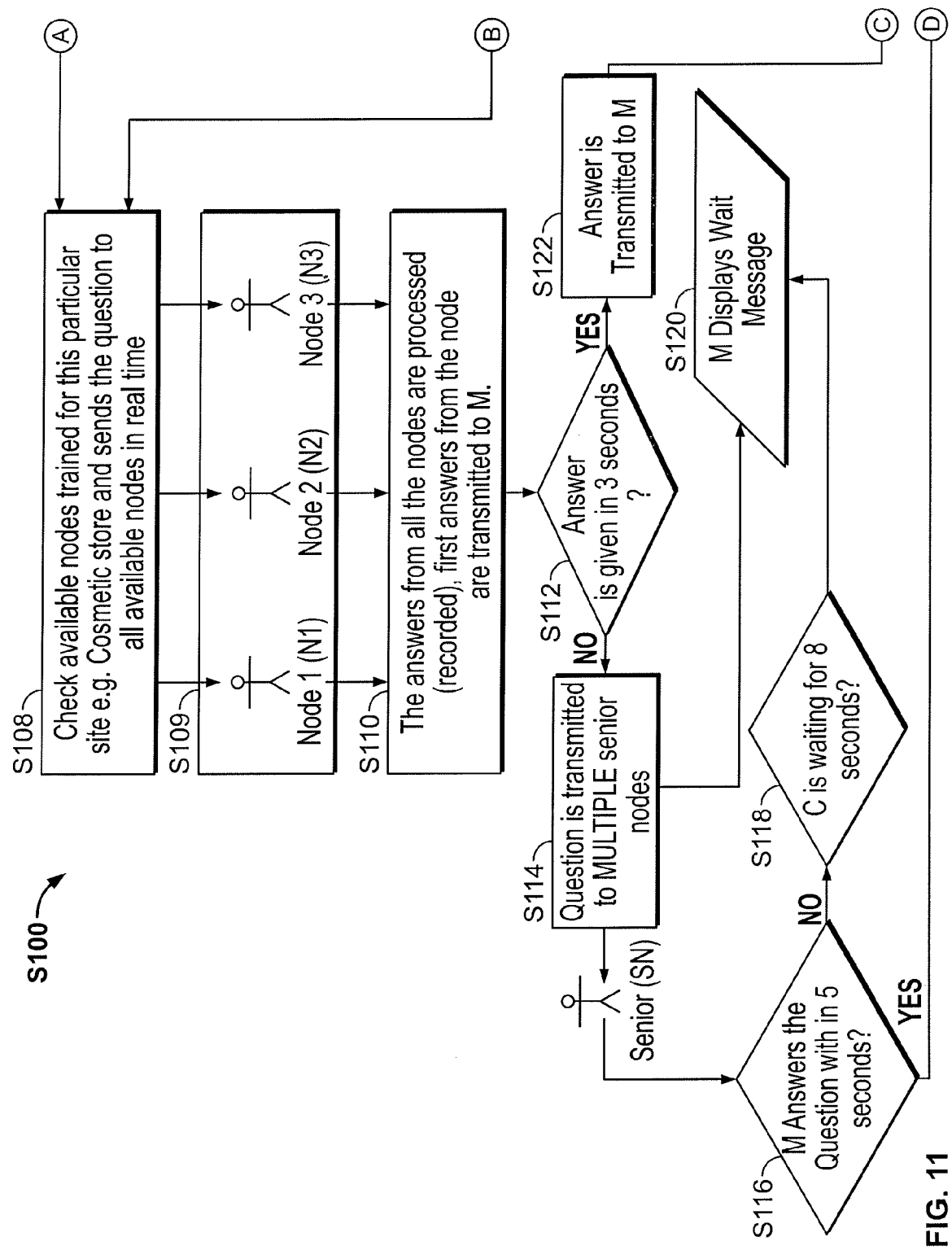
FIG. 11 is a flowchart illustrating example steps associated with a virtual shopping display in accordance with an embodiment.
Figure 11:
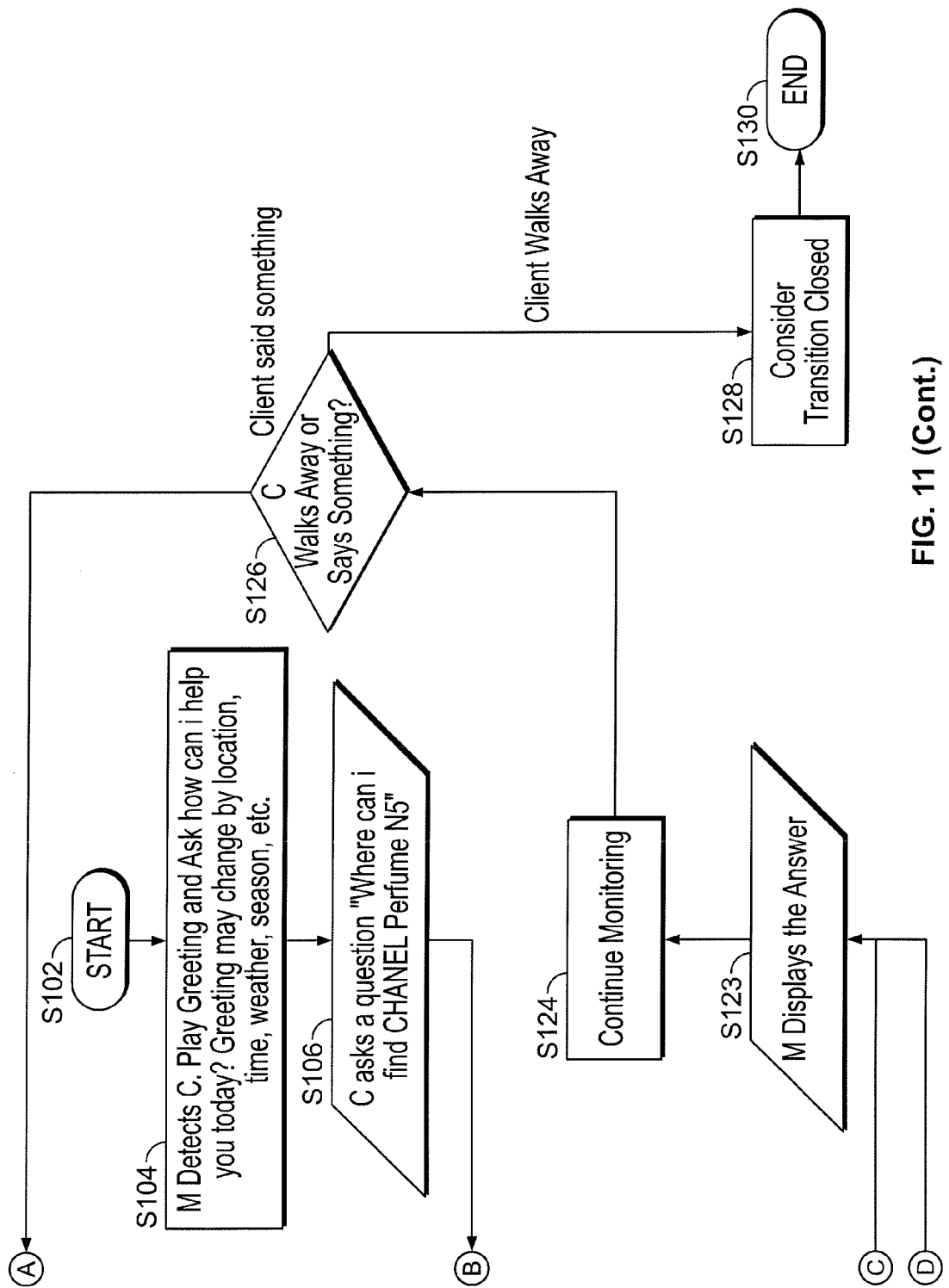
Figure 12:
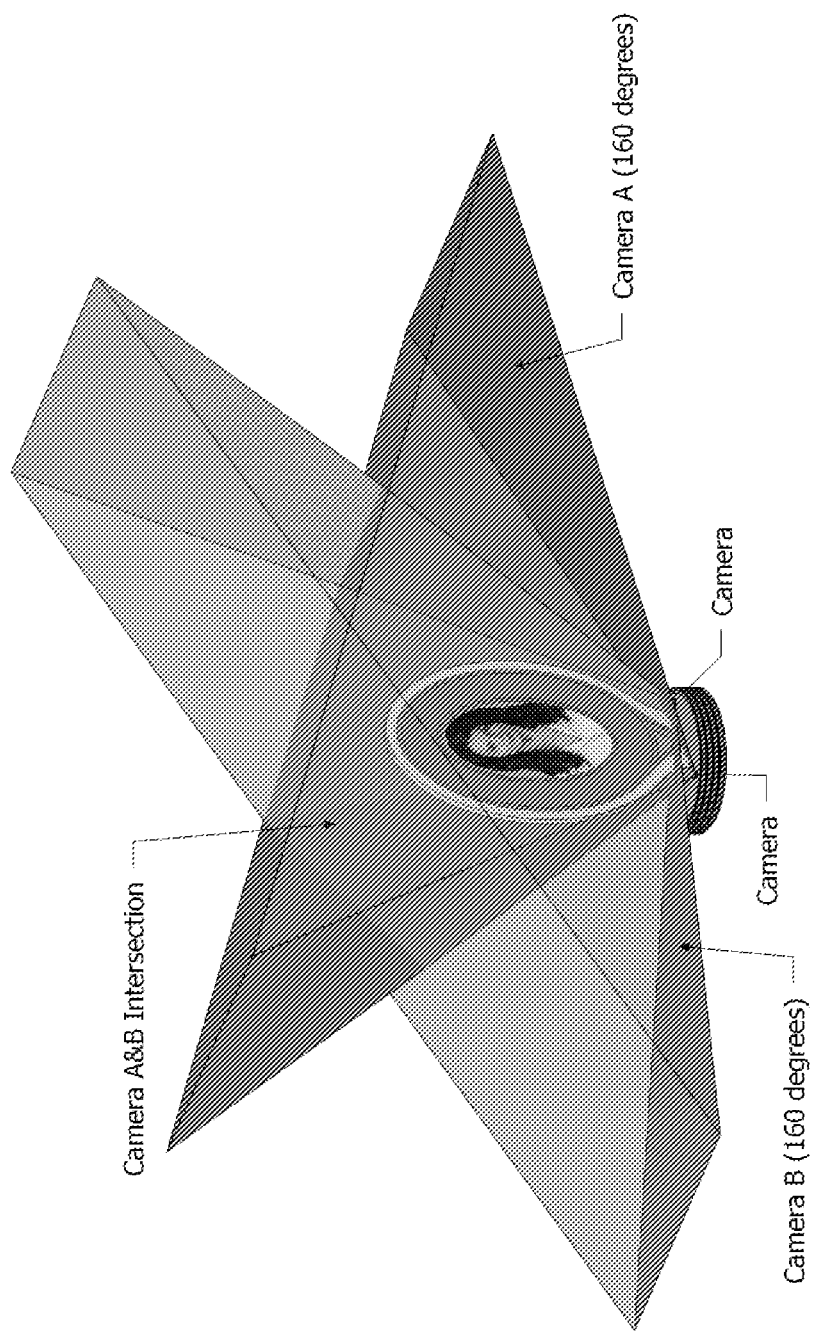
FIG. 12 is an illustration of an example of a virtual human intelligent personal assistant, provided by several cameras.
Figure 13:
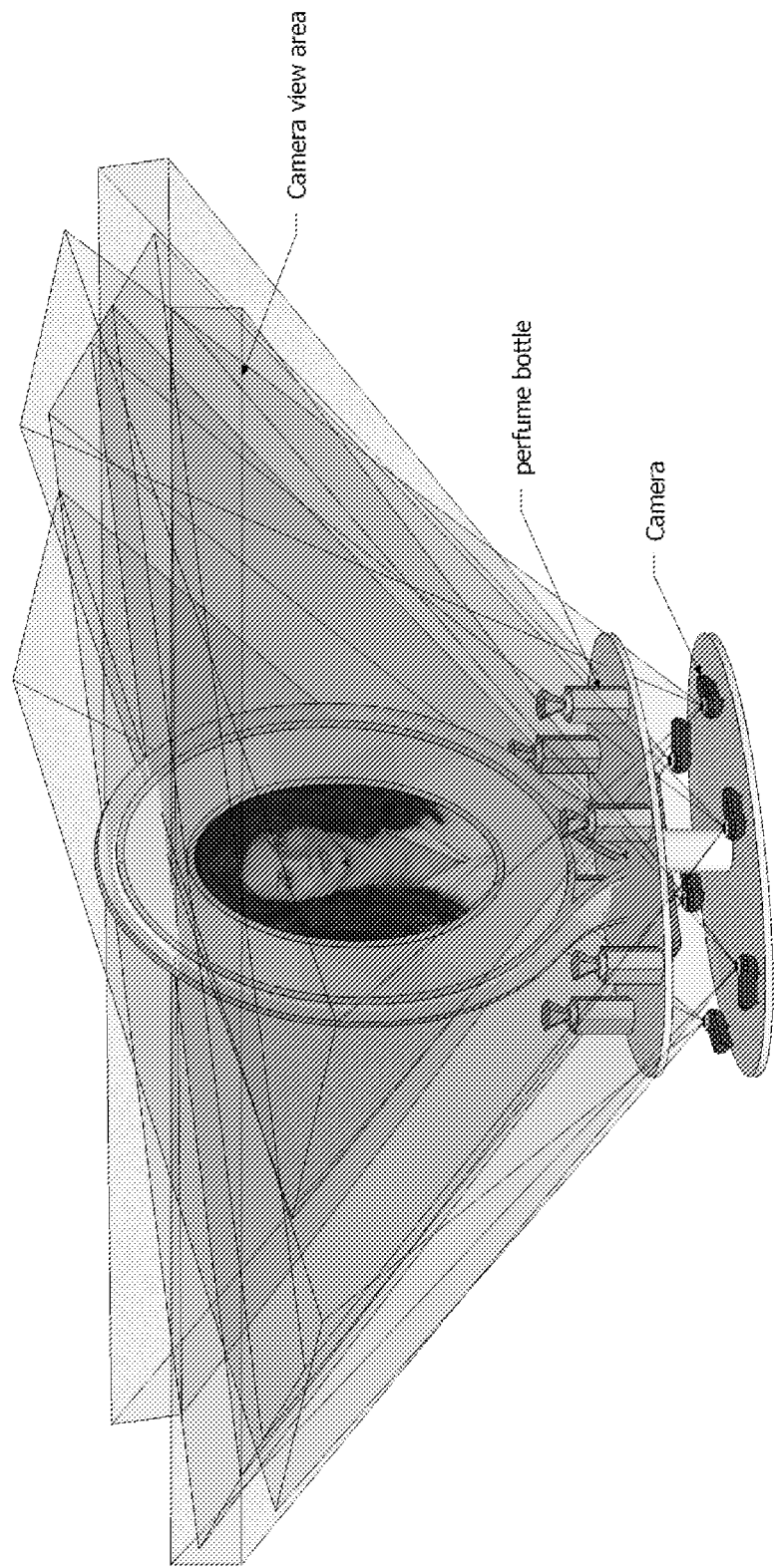
FIG. 13 illustrates the positioning of the cameras and products with which the display is associated with, according to an aspect of the present disclosure.

FIG. 11 is a flowchart illustrating steps S100 associated with an example embodiment of virtual shopping display 300. As illustrated in FIG. 11, at step S102, a process starts and virtual shopping display 300 detects that a customer has approached or is otherwise in close proximity to virtual shopping display 300 (step S104). A customer may be detected via infrared signal technology, ultrasonic technology, image and/or video detection, or other suitable way. Upon detection, virtual shopping display 300 attempts to make contact with the customer, such as by inquiring whether the some assistance may be provided to the customer. At step S106, the customer responds to virtual shopping display 300 by posing a question, such as by asking where a product (e.g., "CHANEL") is located in the store. A substantial variety of queries are supported in accordance with the present application, including, for example, warranty information, product location information, product use information, interactions between a plurality of products or the like.

Continuing with reference to the flowchart shown in FIG. 11, after a query has been received by the customer, the process continues to step S108, and a plurality of "nodes" are identified that are trained or in the process of being trained for supporting the types of products provided with virtual shopping display 300. In this context, a "node" refers, generally, to a computing device user that is trained or in training for interfacing with virtual shopping display 300, such as for product support. As described in other detail in co-pending and co-owned U.S. patent application Ser. No. 13/019,974, nodes may be provided for various other kinds of support other than or in addition to product support. In the embodiment illustrated in FIG. 11, all such available nodes are sent the customer's query, and each works to provide an answer thereto (step S109).

In an embodiment and as described in other detail in co-pending and co-owned U.S. patent application Ser. No. 13/019,974, nodes may respond to customer queries by accessing a computing device and may input at least a portion thereof (e.g., one or more relevant keywords) to receive one or more prepared responses or answers that are retrieved from one or more databases. Alternatively, at least a portion of a customer query may be submitted without any or substantially without any human interaction and prepared replies may be provided to a node.

Continuing with reference to the flowchart shown in FIG. 11, answers from at least two of the respective nodes are received by virtual shopping display 300 (step S110). The replies may be compared and/or cross-referenced to determine the relative accuracy thereof in order to ensure the most effective and helpful response to a customer.

It is possible in some circumstances that a customer will present a query that is difficult to respond to, or may be impossible. Accordingly, and at step S112, an amount of time is calculated that represents how long a customer has been waiting for a response to his/her query. If the amount of time for the response to the query is longer than three seconds, then the process branches to step S114 and the query is transmitted to one or more other nodes, such as nodes that may be associated with one or more parties having senior authority and/or experience. Thereafter, a determination is made whether the response to the query has been answered within five seconds (step S116). If not, then another determination is made whether the query has been answered with eight seconds and, if not, then virtual shopping display 300 provides some response to the customer, such as a request to wait until a supervisor has been contacted (step S120). Alternatively, if at step S116, the reply to the query is received within five seconds then the process branches to step S123 and the reply is provided (such as via displaying the answer or speaking the answer via a HIPA). If, in the determination made at step S112 that a reply to the query is received within three seconds, then the process branches to step S122 and the reply is transmitted to virtual shopping display 300, and the process proceeds to step S123. At step S122, one or more additional comments may be provided, such as to thank the customer for the query or a remark that it has been a pleasure to respond.

Continuing with reference to the flowchart shown in FIG. 11, after the response is provided to the customer's query, the customer is continued to be monitored by virtual shopping display 300 (step S124). At step S126, a determination is made whether the customer has walked away or otherwise left the vicinity of virtual shopping display 300. If so, then the process branches to step S128 and the transaction (or transition) is assessed as "closed" and the process ends at step S130. Alternatively, if at step S126 a determination has been made that the customer has made some other comment or query, then the process branches back to step S108.

In addition to prepared replies that may be submitted to customers via virtual shopping display 300, the present application supports providing replies to customer queries that are "ad hoc" or have otherwise not been prepared in advance. Nodes may submit dynamically provided responses to complex queries to provide a very custom tailored presentation via virtual shopping display 300. After responses to queries are provided, additional queries may be received and responded to. Moreover, responses to queries from one or more nodes may be stored in a database and used for replies to future queries. Alternatively, quality control is supported, and one or more replies that appear to be inaccurate, for example, due to incorrect information received or referenced by a node, may be corrected and the database updated accordingly. In this way, the present application regards a dynamically improving support center provided to customers via virtual shopping display 300.

In addition to displaying a virtual person in a highly realistic, 2D/3D platform, an interactive touch screen may be provided for customers to engage and learn about one or more products. Users may make selections of one or more virtually displayed products to promote interactive demonstrations and/or applications regarding the products.

In an embodiment, the virtual salesperson may be recorded using a plurality of 2D/3D cameras. For example, two or more cameras may be positioned near each other, such as, for example, 3 inches, 7 inches, 20 inches, as long as they are turned toward each other at some angle, apart, and focused on the same general or specific area. Images that are received from the cameras and of may be processed to evaluate a common object at two different planes (one from each respective camera). Much as human eyes can perceive depth, images of an object from two cameras placed in close proximity can be used to determine the depth of an object. In one context, as an object (e.g., a product, human hand, or other thing) moves, its depth can be determined and virtual shopping display 300 can react accordingly.

A display device, according to the disclosure may include, for example, an image display that displays at least one image of at least one of a product and person; a support structure coupled to the image display; at least one database that stores a plurality of queries and replies to the queries; and at least one processor that is operatively coupled to the database, and programmed and configured to: receive from the database at least one reply to a first query; transmit at least one instruction to the image display for rendering a plurality of images of the person, wherein the rendered images of the person include providing the at least one reply to the first query.

In the display device the image display may include projection film that receives the at least one image from at least one projector, and further wherein the projection film receives the at least one image from a plurality of projectors.

The display device may include a mirror portion coupled to the image display. The display device of may include at least one camera operatively coupled to the at least one processor, wherein at least one product is provided with the image display, and further wherein images from the at least one camera represent the at least one product.

The processor may be further programmed and configured to determine when at least one of the at least one product moves.

The processor may be further programmed and configured to cause the image display to provide information associated with the at least one product.

The processor may be further programmed and configured to provide the at least one product as a virtual rendering.

The product may be a physical product.

The processor may be further programmed and configured to receive payment for the at least one product.

The display device may include a content sensor that is operable to detect a respective state of at least one shelf and further wherein the processor is programmed and configured to display the at least one image in response to a change in the respective state.

The image display can display at least one of a life-size human being and a head of a human being.

Audio content may be provided with the displayed at least one image.

The image display can display at least one recorded image.

The at least one recorded image can appear three-dimensional.

The image display can display at least one image as a user approaches the display device.

Also contemplated is a method according to the disclosure that will display on at least one image display at least one of a product and person; provide a support structure coupled to the image display; provide at least one database that stores a plurality of queries and replies to the queries; receive, by the at least one processor from the database, at least one reply to a first query; transmit, by the at least one processor, at least one instruction to the at least one image display; render a plurality of images of at least the person, wherein the rendered images of the person include providing the at least one reply to the first query.

A camera may be operatively coupled to the at least one processor; and then at least one product with the at least one image display may be provided, and images from the at least one camera represent the at least one product. At least one image can be displayed as a user approaches the at least one image display.

In this description, various functions and operations may be described as being performed by or caused by software code to simplify description. However, those skilled in the art will recognize that what is meant by such expressions is that the functions result from execution of the code/instructions by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages may be implemented in hardware, firmware, software or any combination thereof.

The disclosure includes methods and apparatuses which perform these methods, including data processing systems which perform these methods, and computer readable media containing instructions which when executed on data processing systems cause the systems to perform these methods.

While the methods and systems have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

It should also be understood that a variety of changes may be made without departing from the essence of the invention. Such changes are also implicitly included in the description.

They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these.

Further, the use of the transitional phrase "comprising" is used to maintain the "open end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive forms so as to afford the applicant the broadest coverage legally permissible in accordance with the following claims. In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Although the present invention is described and shown in relation to particular embodiments thereof, many other variations and modifications and other uses will become apparent to those skilled in the art. Thus, various embodiments and variations are shown and described herein, and it is preferred, therefore, that the present invention be limited not by the specific disclosure herein.

What is claimed is:

1. A computer-implemented method of displaying an intelligent personal assistant based upon a recording of an image of a person, the method comprising:
   detecting, by a computer, a number of people in a line;
   determining, by the computer, that the number of people in the line exceeds a predetermined threshold number;
   rendering, by the computer after the determining, the image of the person as the intelligent personal assistant, including an image of the head and torso of the person and an image of restricted areas above eyebrows and below a chin of the person,
   wherein movement of the image of the person in the restricted areas is rendered to be more static than actual movement of the person, while movement of a facial area of the image of the person, including between the eyebrows and the chin, is rendered to be a realistic representation of the person; and
   displaying, by the computer, the rendered intelligent personal assistant on a display in communication with the computer.

2. The method of claim 1, wherein the method further comprises displaying the intelligent personal assistant to a user in a public space.

3. The method of claim 2, wherein the displaying comprises projecting the intelligent personal assistant onto a film medium.

4. The method of claim 1, wherein the method further comprises recording the image of the person; and
   motion tracking a body of the person during the recording so as to stabilize movement of the image.

5. The method of claim 1, wherein the method further comprises recording the image of the person; and
   placing dots on a body of the person so as to obtain a stabilized image to be used for the image.

6. The method of claim 1, wherein the restricted areas do not include an area below the belt line of the person.

7. The method of claim 1, wherein the restricted areas do not include areas showing movement of hair and breathing of the person.

8. The method of claim 1, wherein the movement of the image in the restricted areas is shown to be more static by only occasionally rendering movement in the restricted areas but not all movement in the restricted areas.

9. The method of claim 1, wherein the method further comprises detecting an image of a user in a vicinity of the intelligent personal assistant; and
   matching, using automated facial recognition processing, the image of the user to a previously stored user image; and
   when a match is found, notifying an attendant of the match.

10. The method of claim 1, wherein the method further comprises:
    obtaining an image of a product or a product's bar code or machine-readable feature; and
    identifying the product and providing to the user information about the product.

11. The method of claim 10, wherein the method further comprises receiving payment from the user by a machine reader reading a credit card of the user for the product displayed.

12. The method of claim 1, wherein the method further comprises detecting a presence of a user when the user is in close proximity to the intelligent personal assistant, the detecting accomplished using infrared signal technology, ultrasound technology, or image detection.

13. The method of claim 1, wherein the intelligent personal assistant is accompanied a voice, provided by a speaker, of the intelligent personal assistant that greets a visitor, and,
    wherein the method further comprises, based on user identification information obtained from the visitor, providing product or service information to the visitor.

14. The method of claim 1, wherein the method further comprises:
    recognizing the presence of a user based on cell number or text message from the user;
    providing information to the user, in accordance with the user's identity, obtained for a product or service; and
    notifying a product or service provider of the presence of the user.

15. The method of claim 1, wherein the method further comprises:
    receiving product or service information from a medium provided by a user;
    identifying automatically the user and the product or service based on the information received; and
    based on the identified product or service, providing product or service information to the user.

16. The method of claim 1, wherein the method further comprises:
    identifying a product associated with a user in a vicinity of a display of the intelligent personal assistant; and
    rendering the image of the intelligent personal assistant and the identified product.

17. The method of claim 1, wherein the intelligent personal assistant is accompanied a voice, provided via a speaker, of the intelligent personal assistant, and wherein the method further comprises providing automatically to a user product or service information or directions responsive to an identification of the user.

18. A non-transitory computer-readable storage medium storing instructions that when executed by a processor cause the processor to:
- detect a number of people in a line;
- determine that the number of people in the line exceeds a predetermined threshold number;
- render, after it is determined that the number of people in the line exceeds a predetermined threshold number, an image of a person as an intelligent personal assistant, including an image of the head and torso of the person and an image of restricted areas above eyebrows and below a chin of the person,
- wherein movement of the image of the person in the restricted areas is rendered to be more static than actual movement of the person, while movement of a facial area of the image of the person, including between the eyebrows and the chin, is rendered to be a realistic representation of the person; and
- display the rendered intelligent personal assistant on a display in communication with the processor.

19. A system for displaying an intelligent personal assistant based upon a recording of an image of a person, the system comprising:
- a processor;
- a film medium;
- a projection display connected to the processor and configured to project the intelligent personal assistant onto the film medium; and
- memory storing processor executable instructions that when executed by the processor cause the processor to:
  - detect a number of people in a line;
  - determine that the number of people in the line exceeds a predetermined threshold number:
  - render, after it is determined that the number of people in the line exceeds a predetermined threshold number, an image of a person as the intelligent personal assistant, including an image of the head and torso of the person and an image of restricted areas above eyebrows and below a chin of the person,
  - wherein movement of the image of the person in the restricted areas is rendered to be more static than actual movement of the person, while movement of a facial area of the image of the person, including between the eyebrows and the chin, is rendered to be a realistic representation of the person; and
  - display the rendered intelligent personal assistant on the projection display connected to the processor.

* * * * *